(12) United States Patent
Gilmore et al.

(10) Patent No.: US 12,715,531 B2
(45) **Date of Patent: *Aug. 25, 2026**

(54) BICYCLE SADDLE WITH SPRING-BASED VIBRATION ISOLATION

(71) Applicant: Toyota Motor Engineering & Manufacturing North America, Inc., Plano, TX (US)

(72) Inventors: Paul A. Gilmore, Ann Arbor, MI (US); Umesh N. Gandhi, Farmington Hills, MI (US); Ryohei Tsuruta, Ann Arbor, MI (US); Michael Paul Rowe, Pinckney, MI (US); Christian Arthur Trager, Canton, MI (US); Brian J. Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 189 days.

This patent is subject to a terminal disclaimer.

(21) Appl. No.: 18/452,887

(22) Filed: Aug. 21, 2023

(65) Prior Publication Data

US 2024/0043080 A1 Feb. 8, 2024

Related U.S. Application Data

(63) Continuation-in-part of application No. 18/161,611, filed on Jan. 30, 2023, now Pat. No. 11,827,299, and (Continued)

(51) Int. Cl.
*B62J 1/02* (2006.01)

(52) U.S. Cl.
CPC ...................................... *B62J 1/02* (2013.01)

(58) Field of Classification Search
CPC ........................................................ B62J 1/02
See application file for complete search history.

(56) References Cited

U.S. PATENT DOCUMENTS 602,354 A 4/1898 Ohlgart
626,602 A 6/1899 Fenton
(Continued)

FOREIGN PATENT DOCUMENTS

CN 2548884 Y 5/2003
CN 1460081 A 12/2003
(Continued)

OTHER PUBLICATIONS

Gilmore et al., U.S. Appl. No. 18/084,195, filed Dec. 19, 2022.
(Continued)

*Primary Examiner* — Philip F Gabler
(74) *Attorney, Agent, or Firm* — Christopher G. Darrow; Darrow Mustafa PC

(57) ABSTRACT

A bicycle saddle system can include a saddle body. The system can include a vibration isolator including a stack of a plurality of conical springs. An intermediate structure can be operatively positioned between the saddle body and the vibration isolator. In some instances, the vibration isolator can be located within a portion of the bicycle frame. In some instances, the vibration isolator can be configured to exhibit a non-linear stiffness profile including a region of quasi-zero stiffness. The system can be used to provide improved vibration isolation performance when using a bicycle saddle.

20 Claims, 24 Drawing Sheets

Related U.S. Application Data a continuation-in-part of application No. 17/956,247, filed on Sep. 29, 2022, now Pat. No. 11,731,721, said application No. 18/161,611 is a continuation-in-part of application No. 17/571,969, filed on Jan. 10, 2022, now Pat. No. 11,565,763, said application No. 17/956,247 is a continuation of application No. 17/156,041, filed on Jan. 22, 2021, now Pat. No. 11,485,437.

(60) Provisional application No. 63/115,881, filed on Nov. 19, 2020.

(56) References Cited

U.S. PATENT DOCUMENTS 640,756 A 1/1900 Douglas
714,121 A 11/1902 Williams
771,841 A 10/1904 Sills
1,468,835 A 9/1923 Rosen
2,162,719 A 6/1939 Hay
2,263,107 A 11/1941 Smirl
2,325,561 A 7/1943 Weber et al.
3,010,713 A 11/1961 Turkovich
3,083,038 A 3/1963 Moulton
3,107,905 A 10/1963 Lucas
3,195,923 A 7/1965 Moulton
3,856,242 A 12/1974 Cook
4,179,135 A 12/1979 Slater
4,421,337 A 12/1983 Pratt
4,568,067 A 2/1986 Iwata
4,925,203 A 5/1990 Buckler
4,984,777 A 1/1991 Kurr et al.
5,163,697 A 11/1992 Kastan
5,248,159 A 9/1993 Moore
5,285,697 A 2/1994 Clausen
5,301,974 A 4/1994 Knapp
5,314,207 A 5/1994 Camfield et al.
5,335,929 A 8/1994 Takagaki et al.
5,354,085 A 10/1994 Gally
5,383,705 A * 1/1995 Voigt ........................ B62J 1/06 297/211
5,417,446 A 5/1995 Pileggi
5,441,292 A 8/1995 Busby
5,462,302 A 10/1995 Leitner
5,489,139 A 2/1996 McFarland
5,498,013 A 3/1996 Hwang
5,501,477 A 3/1996 Moreau
5,505,493 A 4/1996 Camfield et al.
5,507,476 A 4/1996 Lin
5,509,676 A 4/1996 Fukutake et al.
5,509,679 A 4/1996 Leitner
5,511,444 A 4/1996 Clausen et al.
5,570,896 A 11/1996 Collins
5,599,034 A 2/1997 Brigden
5,678,457 A 10/1997 Hals
5,909,890 A 6/1999 Sachs et al.
5,924,714 A 7/1999 Farris et al.
5,954,355 A 9/1999 Hsu
6,089,656 A 7/2000 Hals
6,099,010 A 8/2000 Busby
6,135,477 A 10/2000 D'Aluisio et al.
6,164,424 A 12/2000 Girvin et al.
6,176,476 B1 1/2001 Wang
6,244,610 B1 6/2001 Kramer-Massow
6,260,870 B1 7/2001 Fan
6,260,918 B1 7/2001 Lee
6,409,130 B1 6/2002 Maret
6,425,598 B2 7/2002 Murayama
6,443,524 B1 9/2002 Yu
6,581,494 B2 6/2003 Sechler
6,592,136 B2 7/2003 Becker et al.
6,659,488 B1 12/2003 Beresnitzky et al.
6,712,374 B2 3/2004 Assier
6,886,845 B2 5/2005 Chao
6,935,157 B2 8/2005 Miller
RE39,159 E 7/2006 Klassen et al.
7,146,877 B2 12/2006 You
7,168,726 B2 1/2007 Klein
7,207,585 B2 4/2007 Czysz
7,261,310 B2 8/2007 Yifrah et al.
7,540,516 B2 6/2009 Arnce
7,581,743 B2 9/2009 Graney
7,591,475 B1 9/2009 Calfee
D614,538 S 4/2010 Rochon
7,722,070 B2 5/2010 Ritchey
7,722,072 B2 5/2010 Hoogendoorn
7,798,513 B1 9/2010 Salvant
7,854,425 B2 * 12/2010 Evans ....................... F16F 3/02 267/162
8,006,993 B1 8/2011 Chamberlain
8,439,383 B2 5/2013 Talavasek
8,464,609 B2 6/2013 Shiu et al.
8,500,108 B2 * 8/2013 Rode ......................... F16F 1/32 267/260
8,556,284 B2 10/2013 Appleman
8,707,825 B2 4/2014 Shiu et al.
8,807,585 B2 8/2014 Alan
8,888,117 B2 * 11/2014 Barkley ..................... B62J 1/02 280/283
8,925,949 B2 1/2015 Zecchetto
9,156,521 B2 10/2015 Lumpkin
9,359,036 B2 6/2016 Thompson
9,550,542 B2 1/2017 Figueroa et al.
9,561,834 B2 2/2017 Zawistowski
9,669,891 B2 6/2017 Evans
9,714,065 B2 7/2017 Mondello
9,764,788 B1 9/2017 Sung
9,821,879 B2 11/2017 Hoogendoorn et al.
9,926,033 B1 3/2018 Tsai
9,957,007 B2 * 5/2018 Bigolin ...................... B62J 1/02
9,981,713 B2 5/2018 Tsai
10,039,953 B2 8/2018 Prosnitz
10,300,974 B1 5/2019 O'Reilly
10,351,206 B2 7/2019 Voss
10,611,424 B2 4/2020 McFarland
10,766,563 B2 9/2020 Hoogendoorn et al.
10,822,048 B2 11/2020 Hoogendorn et al.
10,850,785 B2 12/2020 O'Reilly
10,926,830 B2 2/2021 Zawistowski
11,040,754 B2 6/2021 Lynch
11,173,983 B2 11/2021 Zawistowski
11,242,113 B2 2/2022 Gatto et al.
11,299,231 B2 4/2022 Tsutsui et al.
11,312,445 B2 4/2022 Zubieta Andueza et al.
11,338,711 B1 5/2022 Gilmore et al.
11,485,437 B2 * 11/2022 Gilmore ..................... B62J 1/02
11,565,763 B1 * 1/2023 Gilmore .................... F16F 3/02
11,603,153 B2 3/2023 Trager et al.
11,603,903 B2 3/2023 Gandhi et al.
11,628,898 B1 4/2023 Trager et al.
11,731,721 B2 * 8/2023 Gilmore ..................... B62J 1/02 297/212
11,827,299 B2 * 11/2023 Gilmore ................... B62J 1/065
11,927,236 B2 3/2024 Gandhi et al.
12,129,902 B2 10/2024 Gilmore et al.
12,134,439 B2 11/2024 Barenbrug et al.
12,246,792 B2 3/2025 Watanabe
12,337,926 B2 6/2025 Looney
2002/0084620 A1 7/2002 Yu et al.
2004/0061305 A1 4/2004 Christini
2004/0070165 A1 4/2004 Liebetrau et al.
2004/0201199 A1 10/2004 Liebetrau et al.
2006/0260432 A1 11/2006 Hsu
2008/0054595 A1 3/2008 Lu
2009/0025833 A1 1/2009 Schussler
2011/0037210 A1 2/2011 Rode
2011/0285106 A1 11/2011 Talavasek
2012/0223504 A1 9/2012 Antonot
2014/0015220 A1 1/2014 Talavasek
2014/0110979 A1 4/2014 Barkley et al.
2014/0174247 A1 6/2014 Kovalak, Jr. et al.
2014/0274582 A1 9/2014 Simmons
2015/0115569 A1 4/2015 Matheson et al.

(56) References Cited

U.S. PATENT DOCUMENTS

| | | | | |
|---|---|---|---|---|
| 2016/0075400 | A1 | 3/2016 | Ragland et al. | |
| 2016/0152290 | A1 | 6/2016 | Bigolin | |
| 2018/0339744 | A1 | 11/2018 | McFarland | |
| 2019/0186588 | A1* | 6/2019 | Gandhi | F16F 3/02 |
| 2021/0009228 | A1 | 1/2021 | Yi | |
| 2022/0153370 | A1* | 5/2022 | Gilmore | B62J 1/08 |
| 2022/0196109 | A1 | 6/2022 | Gandhi et al. | |
| 2022/0196111 | A1 | 6/2022 | Gandhi et al. | |
| 2022/0299083 | A1 | 9/2022 | Gilmore et al. | |
| 2022/0299084 | A1 | 9/2022 | Gilmore et al. | |
| 2023/0219646 | A1* | 7/2023 | Gilmore | B62J 1/065 280/281.1 |
| 2024/0043080 | A1* | 2/2024 | Gilmore | B62J 1/065 |
| 2024/0083535 | A1 | 3/2024 | Watanabe | |
| 2024/0199158 | A1 | 6/2024 | Gilmore et al. | |
| 2024/0227969 | A1* | 7/2024 | Rowe | B62K 21/20 |
| 2024/0253725 | A1 | 8/2024 | Pfaeffle et al. | |

FOREIGN PATENT DOCUMENTS

| | | | |
|---|---|---|---|
| CN | 112061292 | A | 12/2020 |
| CN | 217575496 | U | 10/2022 |
| DE | 4232655 | C2 | 11/1997 |
| JP | H10-311369 | A | 11/1998 |
| JP | 2006027497 | A | 2/2006 |

OTHER PUBLICATIONS

Rowe et al., U.S. Appl. No. 18/094,111, filed Jan. 6, 2023.

International Search Report and Written Opinion for International Application No. PCT/US2024/013481 mailed on Jun. 14, 2024 (14 pages).

* cited by examiner 1601
301
1603
300
1616
1611
1626
1614
1612
1613
1620
300
1621
1610
1622
1624
1618
1623
1600
1616
1628
300
1626
1614
1612
300
1620
1605
1610
1622
1624
1618
1616
300
1612
1628
1614
300
1604
302
1602
1618
1610

BICYCLE SADDLE WITH SPRING-BASED VIBRATION ISOLATION

CROSS-REFERENCE TO RELATED APPLICATIONS

This application is a continuation-in-part of U.S. patent application Ser. No. 18/161,611, filed on Jan. 30, 2023, which is a continuation-in-part of U.S. patent application Ser. No. 17/571,969, filed on Jan. 10, 2022, now U.S. Pat. No. 11,565,763, issued on Jan. 31, 2023, all of which are incorporated herein by reference in their entireties. This application is also a continuation-in-part of U.S. patent application Ser. No. 17/956,247, filed on Sep. 29, 2022, which is a continuation of U.S. patent application Ser. No. 17/156,041, filed on Jan. 22, 2021, now U.S. Pat. No. 11,485,437, issued on Nov. 1, 2022, which claims the benefit of U.S. Provisional Application No. 63/115,881, filed on Nov. 19, 2020, all of which are incorporated herein by reference in their entireties.

FIELD

The subject matter described herein relates in general to saddles and, more particularly, to bicycle saddles.

BACKGROUND

A bicycle saddle, typically referred to as a bicycle seat, is designed to support a portion of a rider's body. The height of the saddle is often adjustable. The saddle can be made in various shapes and sizes. The saddle can be configured to provide some amount of comfort for the rider, such as by including padding.

SUMMARY

In one respect, the present disclosure is directed to a bicycle saddle system. The system can include a saddle body. The system can include a vibration isolator including a stack of a plurality of conical springs. The system can include an intermediate structure operatively positioned between the saddle body and the vibration isolator.

In another respect, the present disclosure is directed to a system for vibration isolation of a bicycle saddle. The system can include a bicycle saddle. The system can include a bicycle frame. The system can further include an intermediate structure operatively positioned between the bicycle saddle and the bicycle frame. The system can include a vibration isolator located within a portion of the bicycle frame. The vibration isolator can be operatively positioned with respect to the intermediate structure. The vibration isolator can include a plurality of conical springs arranged in a stack. The vibration isolator can be configured to exhibit a non-linear stiffness profile including a region of quasi-zero stiffness.

DETAILED DESCRIPTION

Figure 1:
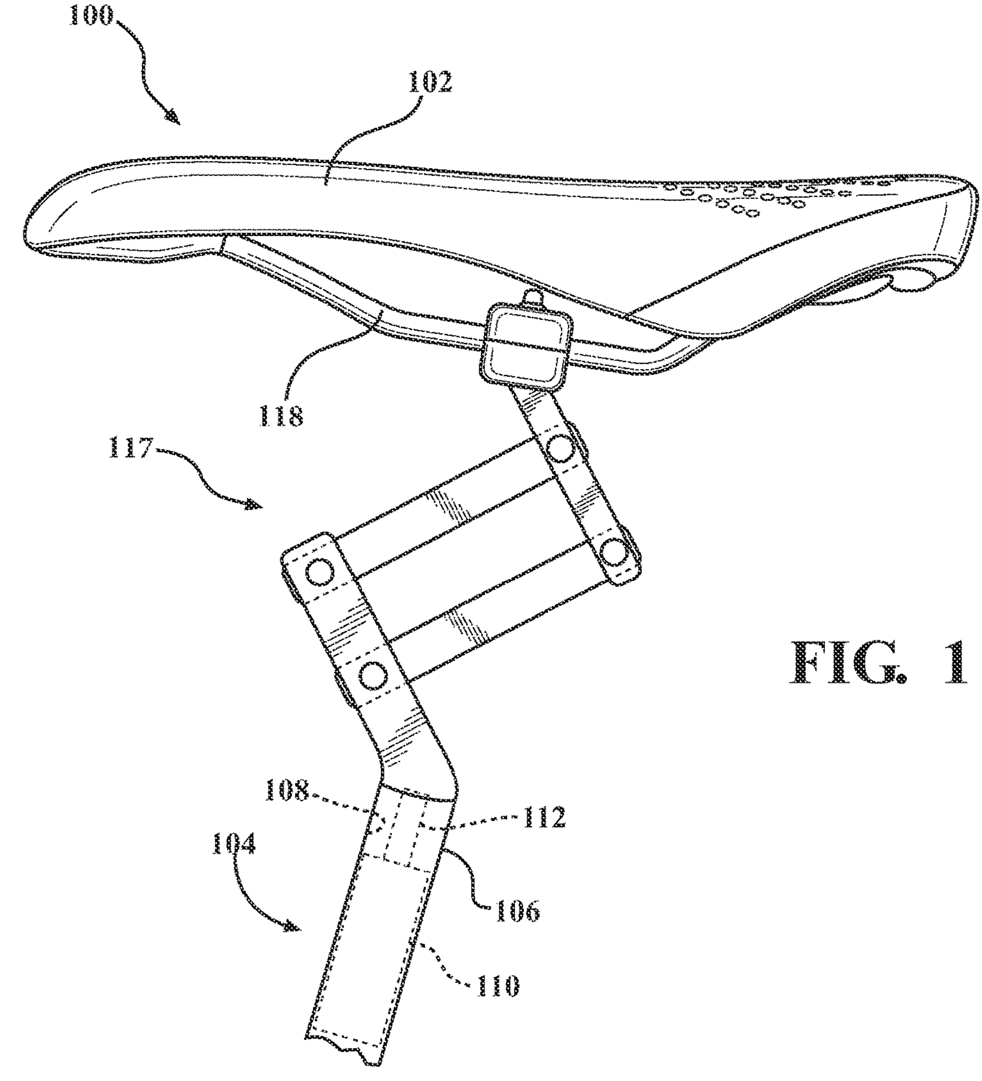
FIG. 1 is an example of a portion of a bicycle.

When in use, a bicycle may be driven over rough or otherwise non-smooth surfaces. As a result, vibrations may be transmitted to the bicycle seat or saddle. These vibrations can cause rider discomfort and/or reduce ride quality. According to arrangements described herein, a vibration isolator and a system can be configured to manage vibrations and/or forces that may be encountered during bicycle use.

A vibration isolator can be configured to exhibit a non-linear stiffness profile. The non-linear stiffness profile can include a region of quasi-zero stiffness. The vibration isolator can include a plurality of spring members arranged in a stack. The vibration isolator can be used in connection with a system. In such case, the vibration isolator can be located within a portion of a bicycle frame. The vibration isolator can be operatively positioned with respect to the bicycle saddle. In some instances, an intermediate structure can be operatively positioned between the saddle body and the vibration isolator.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-26, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a portion of a bicycle 100 is shown. While arrangements described herein will be made with respect to a bicycle, it will be understood that arrangements described herein can be used in connection with various devices that include a seat or saddle. For instance, arrangements described herein can be used in connection with any powered or non-powered vehicle, including, for example, a unicycle, a motorcycle, or a tricycle.

The bicycle 100 can include a saddle 102, which may also be referred to as a seat. The saddle 102 can be designed to support a portion of a rider's body. The saddle 102 can provide cushioning and/or comfort to a user. The saddle 102 can be any type of saddle, now known or later developed.

The saddle 102 can be operatively connected to a frame 104 of the bicycle in any suitable manner, now known or later developed. In one or more arrangements, the saddle 102 can be operatively connected to a seat post 106. The seat post 106 can be a tubular structure. In some arrangements, at least a portion of the seat post 106 can be hollow. In such cases, the seat post 106 can have an inner peripheral surface 108. The term "operatively connected," as used throughout this description, can include direct or indirect connections, including connections without direct physical contact.

A vibration isolator 110 can be operatively positioned to reduce vibrations acting upon the saddle 102. The vibration isolator 110 can be provided in any suitable location. In one or more arrangements, the vibration isolator 110 can be located within the hollow interior of the seat post 106. In some arrangements, the vibration isolator 110 can frictionally engage the inner peripheral surface 108 of the seat post 106. In some arrangements, the vibration isolator 110 can be operatively connected to the seat post 106. For instance, the vibration isolator 110 can be operatively connected to the seat post 106 by one or more fasteners, one or more welds, one or more adhesives, and/or one or more forms of mechanical engagement, or any combination thereof. The vibration isolator 110 can be operatively positioned with respect to an engaging structure, such as a pin 112, of the saddle 102 or other structure operatively connected to the saddle 102. In some arrangements, the pin 112 can directly contact the vibration isolator 110. In some arrangements, the pin 112 can be spaced from the vibration isolator 110.

There can be one or more intermediate structures operatively positioned between the saddle 102 and the vibration isolator 110. For instance, the pin 112 can be an intermediate structure operatively positioned between the saddle 102 and the vibration isolator 110. Alternatively or additionally, a four-bar linkage 117, a rail 118, and/or other structure can be an intermediate structure operatively positioned between the saddle 102 and the vibration isolator 110.

In use, the structure above the pin 112 in FIG. 1 (e.g., a four-bar linkage or other structure) can push downwardly on the pin 112. As a result, the pin can push downwardly on the vibration isolator 110. In some arrangements, the structure and the pin 112 can be separate structures. In other arrangements, the structure and the pin 112 can be operatively connected to each other or can be a unitary structure.

It should be noted that, while the arrangements shown in FIG. 1 include a single vibration isolator 110, it will be appreciated that there can be a plurality of vibration isolators 110. In such cases, the plurality of vibration isolators 110 can be arranged in any suitable manner. For instance, the plurality of vibration isolators 110 can be stacked end to end within the seat post 106. When there is a plurality of vibration isolators 110, the vibration isolators 110 can be substantially identical to each other, or one or more of the vibration isolators 110 can be different from the other vibration isolators 110 in one or more respects.

Figure 2A:
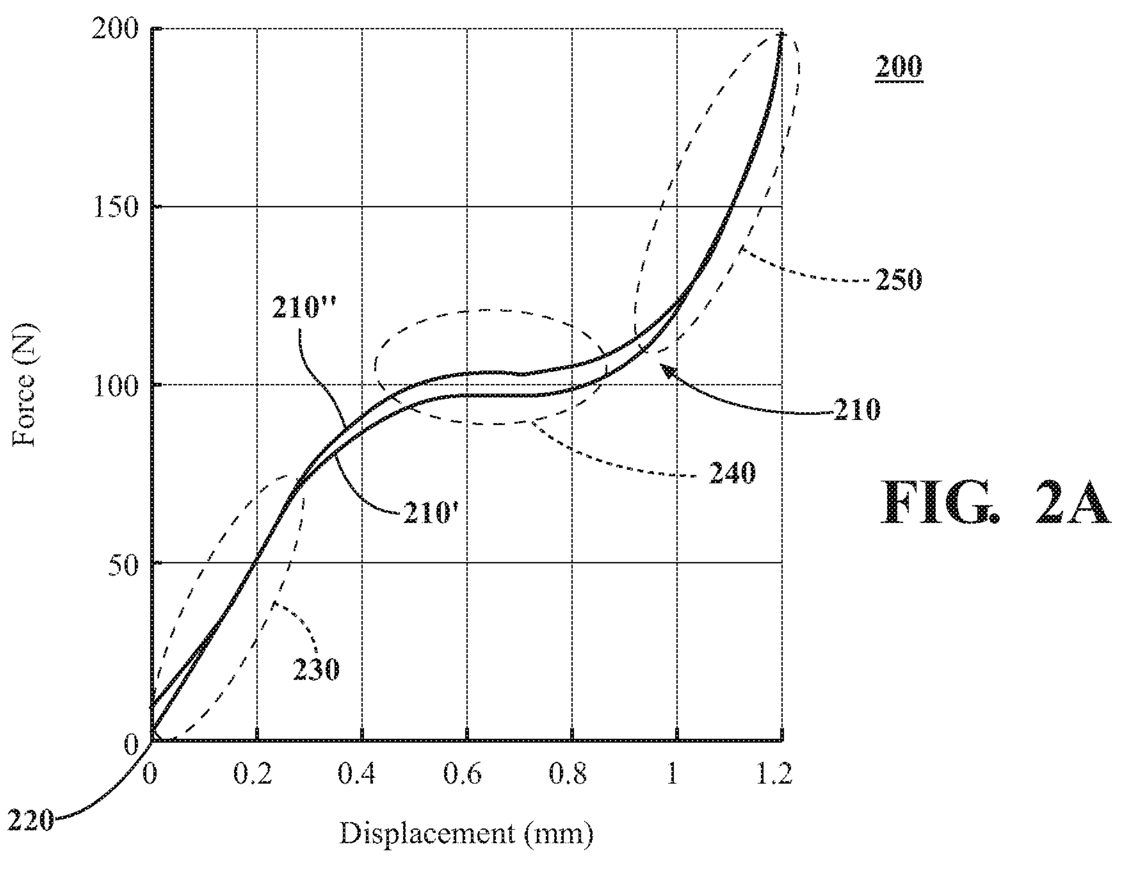
FIG. 2A is an example of a force-deflection curve of a conical spring.

The vibration isolator 110 can be configured to exhibit a non-linear stiffness profile. The non-linear stiffness profile can include a region of quasi-zero stiffness. An example of a force-deflection graph 200 for this type of isolator is shown in FIG. 2A. It is noted that this force-deflection graph 200 is merely an example, as the values will vary depending on various characteristics of the isolator. However, the general shape of a force-deflection curve 210, representing the stiffness profile, is shown. Starting from the origin 220, the vibration isolator 110 can exhibit an initial stiffness region 230 that is substantially linear. The vibration isolator 110 is relatively stiff in the initial stiffness region 230. When load is reached, the force-deflection curve 210 can become zero or substantially zero, which is a quasi-zero stiffness region 240. The quasi-zero stiffness region 240 can allow for good vibration isolation. Continuing beyond the quasi-zero stiffness region 240, the force-deflection curve 210 can have a subsequent stiffness region 250 that is substantially linear. The vibration isolator 110 is relatively stiff in the subsequent stiffness region 250.

It should be noted that there are two force-deflection curves shown in FIG. 2A. A first force-deflection curve 210' represents the vibration isolator 110 going from a non-loaded state to a loaded state. A second force-deflection curve 210" represents the vibration isolator 110 going from a loaded state to a non-loaded state.

Figure 2B:
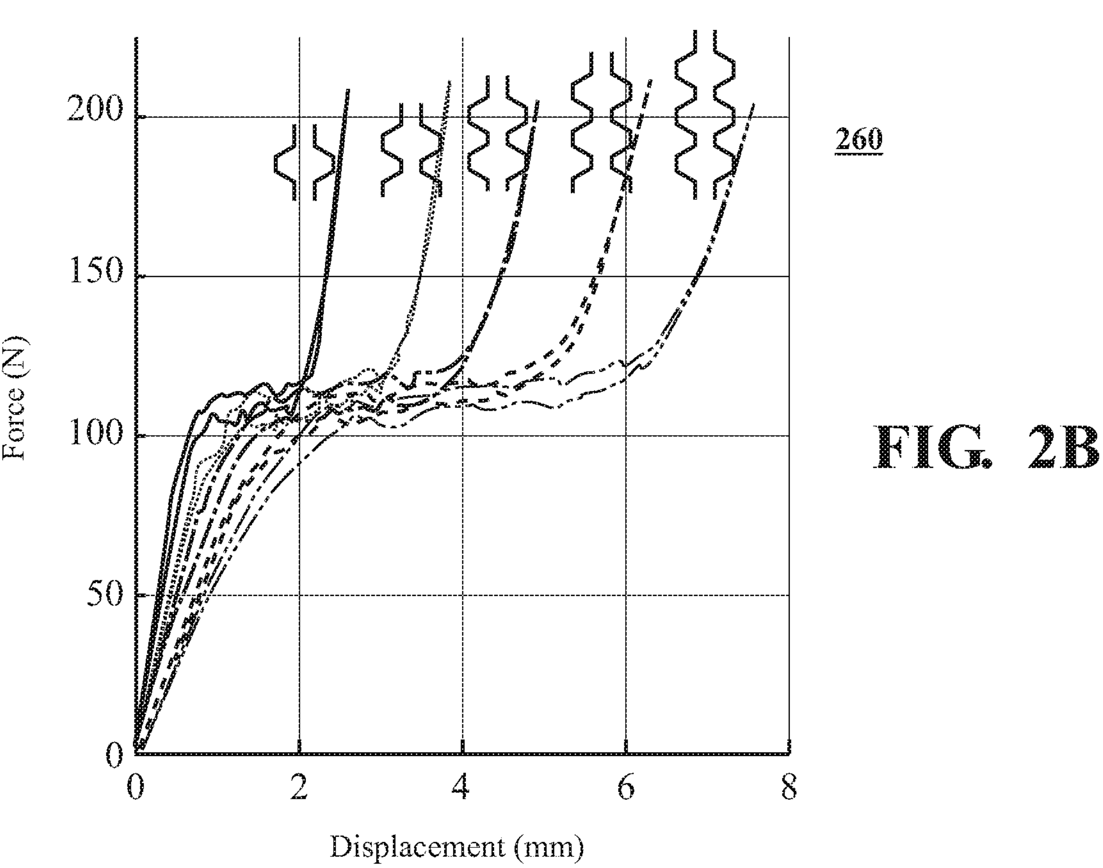
FIG. 2B is an example of the force-deflection curve for various stacks of a plurality of conical springs.

According to arrangements herein, the vibration isolator 110 can include a plurality of spring members. In one or more arrangements, the spring members can be conical springs 300. It should be noted that other terms can be used to describe the conical springs 300, such as Belleville washers, disk springs, conical disks, etc. As more conical springs are added to the stack, the quasi-zero stiffness region 240 of the force-deflection curve 210 can be extended. An example of a force-deflection graph 260 depicting this effect is shown in FIG. 2B. As is evident, the length of the quasi-zero stiffness region increases as the number of conical springs 300 used in the stack increases.

Figure 3:
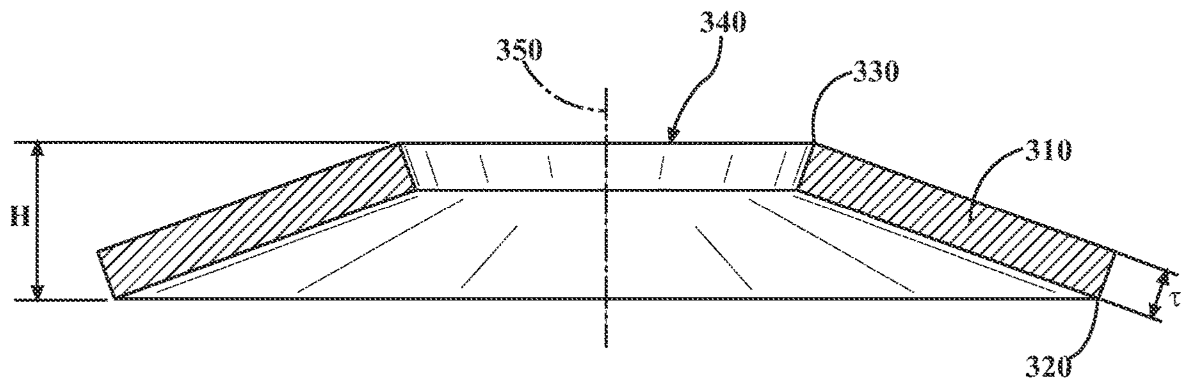
FIG. 3 is a cross-sectional view of an example of a conical spring used in an isolator for the bicycle saddle.

Referring to FIG. 3, an example of a conical spring 300 is shown. The conical spring 300 can have a body 310 with a substantially conical shape. The conical spring 300 can include an outer diameter body portion 320 and an inner diameter body portion 330. The outer diameter body portion 320 can be larger than the inner diameter body portion 330. The conical spring 300 can have a central aperture 340. The conical spring 300 can have a central axis 350. The conical spring 300 can have a height H and a thickness τ. In some arrangements, the conical spring 300 can have a ratio of height H to the thickness τ of about 1 to about 2, about 1.2 to about 1.8, about 1.3 to about 1.5. In some arrangements, the ratio of height H to the thickness τ can be about 1.41.

A plurality of the conical springs 300 can be arranged in any suitable manner in a stack. For instance, in one or more arrangements, the plurality of the conical springs 300 can be arranged in an alternating pattern. For example, the outer diameter body portion 320 of one conical spring 300 can face the outer diameter body portion 320 of a neighboring conical spring 300. Alternatively or additionally, the inner diameter body portion 330 of a conical spring 300 can face the inner diameter body portion 330 of a neighboring conical spring 300. The central apertures 340 of the conical springs 300 can be substantially aligned with each other.

In some arrangements, the stack of the plurality of conical springs 300 does not include a central shaft that passes through the central apertures 340 of the plurality of conical springs 300. Alternatively or additionally, the plurality of conical springs 300 does not include an outer sleeve that encloses the plurality of conical springs 300.

There are numerous ways in which the plurality of conical springs 300 can be arranged in a stack. Some examples will be described herein, but it will be understood that arrangements are not limited to these examples.

The vibration isolator 110 can have various configurations, some of which will be described herein in connection with FIGS. 4-7. Each of these configurations will be described in turn below.

Figures 4A, 4B, 4C:
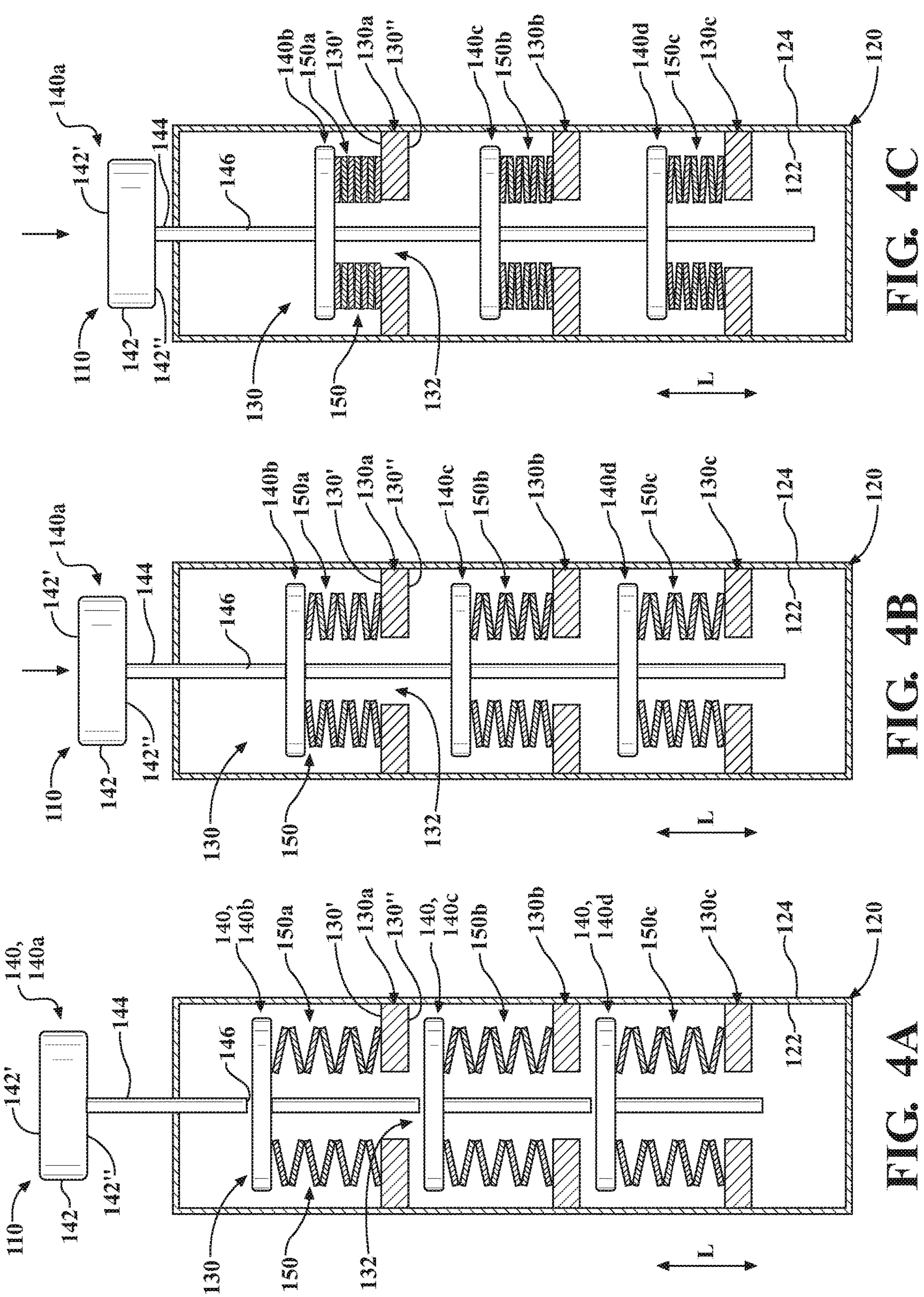
FIG. 4A is a cross-sectional view of a first example of an isolator for a bicycle saddle, showing a non-activated state.
FIG. 4B is a cross-sectional view of the first example of an isolator for a bicycle saddle, showing an activated state.
FIG. 4C is a cross-sectional view of the first example of an isolator for a bicycle saddle, showing a further activated state.

Referring to FIGS. 4A-4B, a first example of the vibration isolator 110 is shown. The vibration isolator 110 can include an outer housing 120. The outer housing 120 can have any suitable size, shape, and/or configuration. In one or more arrangements, the outer housing 120 can be substantially cylindrical. The outer housing 120 can be hollow. The outer housing 120 can have an inner peripheral surface 122 and an outer peripheral surface 124. The outer housing 120 can be made of any suitable material, including, for example, metals or plastics.

The vibration isolator 110 can include one or more landings 130. The landings 130 can be operatively connected to the outer housing 120. For example, the landings 130 can be operatively connected to the inner peripheral surface 122 of the outer housing 120 by one or more fasteners, one or more welds, one or more adhesives, and/or one or more forms of mechanical engagement, or any combination thereof. The landings 130 can be fixed landings in that they do not move. In some arrangements, the landings 130 can be fixed landings at least in that they do not move at least in the longitudinal direction L of the vibration isolator 110.

The landings 130 can have any suitable form. For instance, in one or more arrangements, the landings 130 can be substantially cylindrical in conformation. In some arrangements, one or more of the landings 130 can be a single piece. Alternatively, one or more of the landings 130 can be made of a plurality of segments. The landings 130 can define a central aperture 132.

The landings 130 can have an upper side 130' and a lower side 130". It will be appreciated that the terms “upper” and “lower” are made with respect to the orientation of the vibration isolator 110 in FIGS. 4A-4B. However, it will be understood that these terms are used for convenience to facilitate the discussion and are not intended to be limiting.

The landings 130 can be substantially identical to each other. Alternatively, one or more of the landings 130 can be different from the other landings in one or more respects. The landings 130 can be substantially equally spaced from each other. Alternatively, one or more of the landings 130 may be non-equally spaced. The landings 130 can be made of any suitable material, including, for example, metals or plastics.

The vibration isolator 110 can include any suitable number of landings 130. In the arrangements shown in FIGS. 4A-4B, there can be three landings. However, it will be appreciated that there can be a greater or fewer number of landings. To facilitate the discussion, the uppermost landing in FIG. 4A will be referred to as the first landing 130*a*. Continuing downwardly in the longitudinal direction L, the next landing will be referred to as the second landing 130*b*. The lowermost landing will be referred to as the third landing 130*c*.

The vibration isolator 110 can include a plurality of plungers 140. The plungers 140 can be any movable structure and can have any suitable configuration. For instance, in one or more arrangements, one or more of the plungers 140 can include a head 142 and a shaft 144. The head 142 can include an upper side 142' and a lower side 142". The shaft 144 can extend from the head 142 and, more particularly, from the lower side 142" of the head 142. The shaft 144 can extend to a distal end 146.

The vibration isolator 110 can include any suitable number of plungers 140. In the arrangements shown in FIGS. 4A-4B, there can be four plungers. However, it will be appreciated that, in some arrangements, there can be a greater or fewer number of plungers. To facilitate the discussion, the uppermost plunger in FIG. 4A will be referred to as the first plunger 140*a*. Continuing downwardly in the longitudinal direction L, the next plunger will be referred to as the second plunger 140*b*. Continuing further downwardly in the longitudinal direction L, the next plunger will be referred to as the third plunger 140_c_. The lowermost plunger will be referred to as the fourth plunger 140_d_.

The head 142 can have any suitable size, shape, and/or configuration. The shafts 144 can have any suitable size, shape, and/or configuration. The head 142 and the shaft 144 can be a unitary structure, or they can be separate pieces subsequently joined together. In some arrangements, the head 142 can be substantially circular, rectangular, polygonal, or triangular in conformation. In some arrangements, the shaft 144 can have a substantially circular, rectangular, polygonal, or triangular cross-sectional shape.

In some arrangements, the shafts 144 of the plungers 140 can be substantially aligned with each other within the vibration isolator 110. In some arrangements, one or more of the shafts 144 can be offset from the other shafts 144.

The plungers 140 can be substantially identical to each other. Alternatively, one or more of the plungers 140 can be different from the other plungers 140 in one or more respects, including, for example, head width, head shape, head thickness, shaft length, shaft diameter or width, and/or shaft cross-sectional shape. In some arrangements, the head 142 and a portion of the shaft 144 of the first plunger 140_a_ can extend outside of the outer housing 120. This exposed portion of the first plunger 140_a_ can engage with the engaging structure (e.g., the pin 112 in FIG. 1). The plungers 140 can be made of any suitable material, including, for example, metals or plastics.

As noted above, the vibration isolator 110 can include a plurality of spring members, such as conical springs 150. The conical springs 150 can be any suitable conical spring, now known or later developed. The spring members can be any suitable type of spring member, now known or later developed.

The conical springs 150 can be arranged in any suitable manner. For instance, a plurality of conical springs 150 can be arranged in a stack. The conical springs 150 can be arranged in any suitable manner in the stack. For instance, the plurality of conical springs 150 can be arranged in an alternating pattern, as described above in connection with FIG. 3 and as shown in FIGS. 4A-4C.

A first stack of conical springs 150_a_ can be operatively connected to and/or operatively positioned with respect to the second plunger 140_b_ (e.g., the lower side 142" of the head 142 of the second plunger 140_b_) and the first landing 130_a_ (e.g., the upper side 130' of the first landing 130_a_). A second stack of conical springs 150_b_ can be operatively connected to and/or operatively positioned with respect to the third plunger 140_c_ (e.g., the lower side 142" of the head 142 of the third plunger 140_c_) and the second landing 130_b_ (e.g., the upper side 130' of the second landing 130_b_). A third stack of conical springs 150_c_ can be operatively connected to and/or operatively positioned with respect to the fourth plunger 140_d_ (e.g., the lower side 142" of the head 142 of the fourth plunger 140_d_) and the third landing 130_c_ (e.g., the upper side 130' of the third landing 130_c_).

Any suitable manner of operative connection can be provided between the stacks of conical springs 150 and the respective landings 130 and plungers 140. For example, the operative connection can include one or more fasteners, one or more welds, one or more brazes, one or more adhesives, and/or one or more forms of mechanical engagements, or any combination thereof. In some instances, the stacks of conical springs 150 may not be attached to their respective landings 130 and/or plungers 140.

Each of the stacks of conical springs 150_a_, 150_b_, 150_c_ can have any suitable quantity of the conical springs. In some arrangements, each of the stacks of conical springs 150_a_, 150_b_, 150_c_ can include the same number of conical springs. In some arrangements, the quantity of the conical springs in at least one of the stacks can be different from the other stacks. In some arrangements, the conical springs used in each stack can be substantially identical. However, in some arrangements, one or more of the conical springs in one of the stacks can be different from the other conical springs in the same stack or in the other stacks. In some arrangements, the conical springs can be arranged in the same way in each stack. However, in other arrangements, the conical springs in at least one of the stacks can be arranged differently from the other stacks.

FIG. 4A shows the vibration isolator 110 in a non-activated configuration, and FIGS. 4B and 4C show examples of the vibration isolator 110 in an activated configuration. In the non-activated configuration, the distal ends 146 of the plungers 140 can be spaced a distance from the respective heads 142 of the neighboring plungers 140.

When a load is imposed upon the head 142 of the first plunger 140_a_, such as from the pin 112, the first plunger 140_a_ can be moved downwardly. Eventually, the distal end 146 of the first plunger 140_a_ can come into contact with the upper side 142' of the head 142 of the second plunger 140_b_. As the first plunger 140_a_ moves further downwardly, the head 142 of the second plunger 140_b_ will be moved downwardly. As a result, the first stack of conical springs 150_a_ can be compressed. The process can continue with the other plungers 140 and the stacks of conical springs 150. FIGS. 4B and 4C show different stages of compression of the stacks of conical springs 150.

In the arrangement shown in FIG. 4A, the vibration isolator 110 can be in the initial stiffness region 230 of the force-deflection curve 210. As can be seen, the conical springs 150 can be substantially in their neutral condition. In the initial stiffness region 230, the stiffness curve can be substantially linear, increasing from the origin of the graph. The vibration isolator 110 can be relatively stiff in the initial stiffness region 230.

In FIGS. 4B and 4C, the vibration isolator 110 can be in the quasi-zero stiffness region 240 of the force-deflection curve 210. In the quasi-zero stiffness region 240, the force-deflection curve becomes substantially flat. The stiffness becomes very low—zero or substantially zero. The quasi-zero stiffness region 240 allows for good isolation. In the quasi-zero stiffness region 240, the conical springs 150 can become substantially flat, as is shown in FIG. 4C.

Figures 9A, 9B, 10, 11, 12:
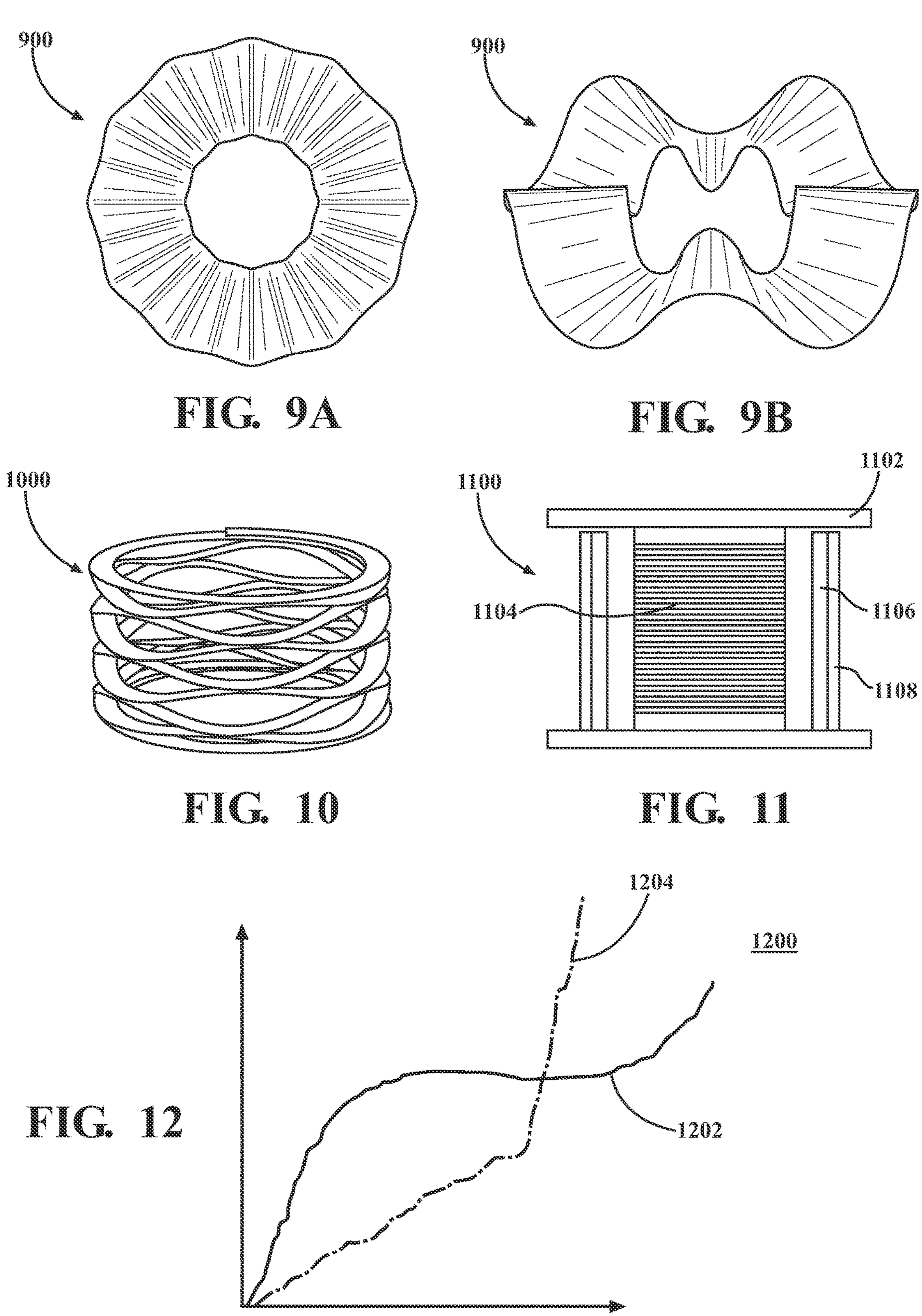
FIGS. 9A-9B are views of an example of an annular wave spring.
FIG. 10 is an example of a multi-turn wave spring.
FIG. 11 is an example of a magnetic elastomer isolator.
FIG. 12 is an example of a force versus deflection graph, showing the difference in curves for spring-based vibration isolators and linear springs.

It will be appreciated that the non-linear stiffness profile of the vibration isolator 110 according to arrangements described herein can provide improved vibration isolation performance compared to a linear spring type system. A general representation of the performance differences is shown in FIG. 12, which presents a force versus deflection graph 1200. One curve 1202 represents the performance of a vibration isolator according to arrangements described herein. Another curve 1204 represents the performance of a vibration isolator with a linear spring. The curve 1202 includes a quasi-zero stiffness region, but the curve 1204 does not.

While FIGS. 4A-4C present one potential arrangement of a stack of conical springs, it will be understood that arrangements are not limited to the examples shown and described. Further, in some arrangements, the stacks of conical springs can include other elements. Indeed, in some instances, the stack of conical springs can include locking spacers and/or non-locking spacers. Such locking spacers and/or non-locking spacers can be located between neighboring conical springs. Examples of such arrangements are shown in U.S.

patent application Ser. No. 17/156,041, which is incorporated herein by reference in its entirety.

Figures 5, 6A, 6B:
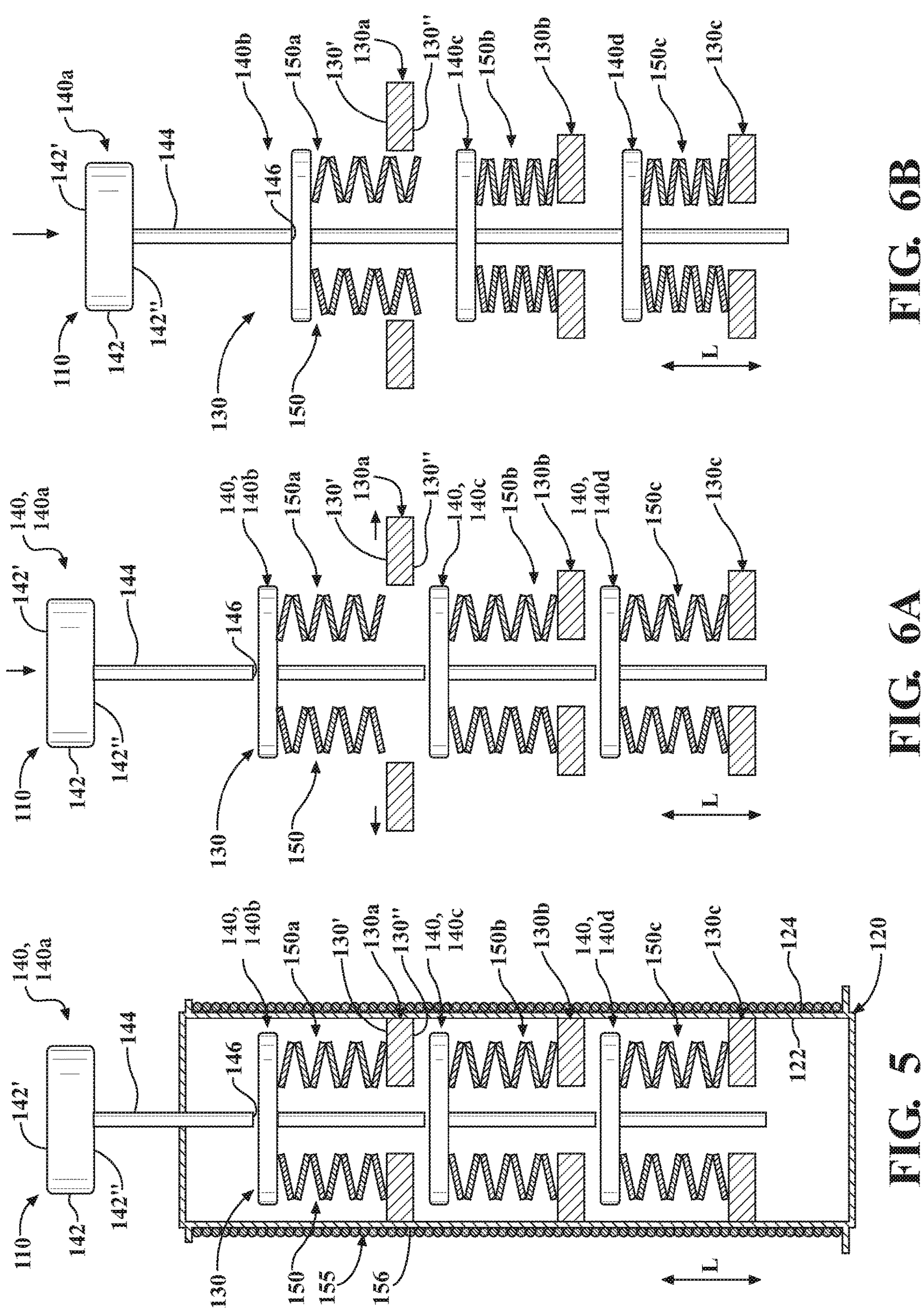
FIG. 5 is a cross-sectional view of a second example of an isolator for a bicycle saddle, showing a non-activated state.
FIG. 6A is a cross-sectional view of a third example of an isolator for a bicycle saddle, showing a non-activated state.
FIG. 6B is a cross-sectional view of the third example of an isolator for a bicycle saddle, showing an activated state.

Referring to FIG. 5, another example of the vibration isolator 110 is shown. To streamline the discussion, the above description of the outer housing 120, the landings 130, and the plungers 140 applies equally here and will not be repeated. Also, the reference numbers used in FIGS. 4A-4C are used for the like structures in FIG. 5.

In FIG. 5, the stacks of spring members (e.g., conical springs 150) can include stacks of magnetically activated spring members. In one or more arrangements, the magnetically activated spring members can be annular wave springs 900 (FIGS. 9A-9B). The annular wave springs 900 can be made of a metallic-glass. The annular wave springs 900 can be made of an amorphous metal structure. In one or more arrangements, the annular wave springs 900 can be made of Metglas, which is available from Metglas Inc., Conway, SC. Examples of wave springs are described in Panagiotopoulos et al., "Advanced ultra-light multifunctional metallic-glass wave springs." Materials & Design 192 (2020): 108770, which is incorporated herein by reference in its entirety. In some arrangements, the magnetically activated spring members can be conical springs made of a magnetically responsive material, such as Metglas.

In one or more arrangements, the magnetically activated spring members can be multi-turn wave springs 1000 (FIG. 10). The multi-turn wave springs 1000 can be made of a shape memory alloy. Examples of multi-turn wave springs are described in Spaggiari et al., "Multiphysics modelling and design of shape memory alloy wave springs as linear actuators." Smart Materials, Adaptive Structures and Intelligent Systems. Vol. 44151. 2010, which is incorporated herein by reference in its entirety. In some arrangements, the magnetically activated spring members can be a magnetic elastomer isolator 1100 (FIG. 11). The magnetic elastomer isolator 1100 can include a top plate 1102, laminated magnetorheological elastomer (MRE) and steel layers 1104, a coil 1106, and a yoke 1108 (e.g., a steel yoke). Examples of magnetic elastomer isolators are described in Li et al., "A highly adjustable magnetorheological elastomer base isolator for application of real-time adaptive control." Smart Materials and Structures 22.9 (2013): 095020, which is incorporated herein by reference in its entirety. The magnetically activated spring members can be made of a material whose characteristics or properties change when exposed to a magnetic field. For example, the elastic modulus of the spring members can change when a magnetic field is applied. More particularly, the elastic modulus can change to a higher value. The magnetic field can change the stiffness of the spring members.

Further, the vibration isolator 110 can include a magnetic field generator 155. The magnetic field generator 155 can be any structure or device, now known or later developed, for generating a magnetic field. As an example, the magnetic field generator 155 can be a magnetic coil 156 and/or other components. The magnetic coil 156 can be operatively positioned with respect to the spring members (e.g., conical springs 150). In some arrangements, the magnetic coil 156 can be wrapped about at least a portion of the outer peripheral surface 124 of the outer housing 120. The magnetic coil 156 can be operatively connected to one or more power sources (see FIG. 8). The generation of the magnetic field can be controlled by one or more processors (FIG. 8), which can selectively allow or prevent the flow of electrical energy to the magnetic field generator 155.

FIG. 5 shows the vibration isolator 110 in a non-activated configuration. When a load is imposed upon the head 142 of the first plunger 140_a_, such as from the pin 112, the first plunger 140_a_ can be moved downwardly. Eventually, the distal end 146 of the first plunger 140_a_ can come into contact with the upper side 142' of the head 142 of the second plunger 140_b_. As the first plunger 140_a_ moves further downwardly, the head 142 of the second plunger 140_b_ will be moved downwardly. As a result, the first stack of magnetically activated conical springs 150_a_ can be compressed. The process can continue with the other plungers 140 and the stacks of magnetically activated spring members.

Thus, when the vibration isolator is subjected to forces, the magnetic field generator 155 can be activated to alter the performance characteristics of the magnetically activated spring members. As a result, the magnetically activated spring members can be altered so as to operate in the quasi zero stiffness region of the force-deflection curve to allow for good isolation.

Referring to FIGS. 6A-6B, another example of the vibration isolator 110 is shown. To streamline the discussion, the above description of the outer housing 120, the landings 130, the plungers 140, and the stacks of conical springs 150 made in connection with FIGS. 4A-4C applies equally here and will not be repeated. Also, the reference numbers used in FIGS. 4A-4C are used for the like structures in FIGS. 6A-6B. In FIGS. 6A-6B, the outer housing 120 is not shown for clarity.

Here, one or more of the landings 130 can be configured to be selectively movable. The landings 130 can be movable to move out of the way of the associated stack of conical springs 150. The landings can have any suitable movement. In one or more arrangements, the landings 130 can move laterally or radially outward. An example of such movement is shown in FIG. 6A. As can be seen, the first landing 130_a_ is moved laterally outward. As a result, the first landing 130_a_ is no longer in the way of the first stack of conical springs 150_a_. Thus, when the second plunger 140_b_ is moved downwardly in the longitudinal direction L, the first stack of conical springs 150_a_ is not compressed. As a result, the first stack of conical springs 150_a_ does not contribute to the performance of the vibration isolator. Rather, in this instance, only the second stack of conical springs 150_b_ and the third stack of conical springs 150_c_ would contribute to the overall vibration isolation performance of the vibration isolator 110.

Figures 7, 8:
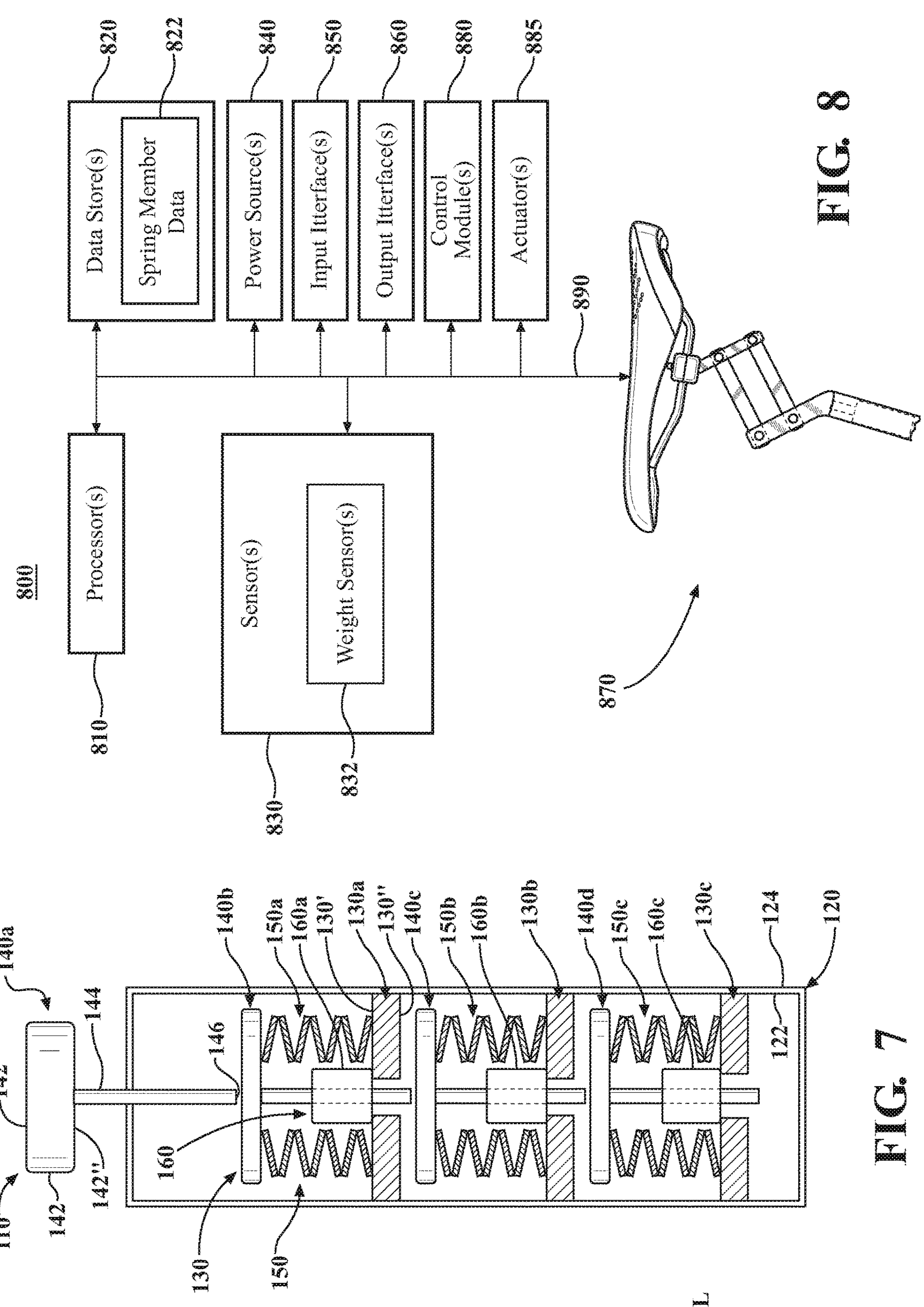
FIG. 7 is a cross-sectional view of a fourth example of an isolator for a bicycle saddle, showing a non-activated state.
FIG. 8 is an example of a vibration isolation system.

The landings 130 can be movable in any suitable manner. For instance, in one or more arrangements, the landings 130 can be operatively connected to one or more actuators 885 (FIG. 8). The actuator(s) 885 can cause the movement of the landings 130. The actuator(s) 885 can be controlled by one or more processor(s) 810 (FIG. 8).

In this example, the first stack of conical springs 150_a_ can be operatively connected to the second plunger 140_b_. Thus, when the first landing 130_a_ is moved out of the way, the first stack of conical springs 150_a_ remains attached to the second plunger 140_b_.

Referring to FIG. 7, another example of the vibration isolator 110 is shown. To streamline the discussion, the above description of the outer housing 120, the landings 130, the plungers 140, and the stacks of conical springs 150 made in connection with FIGS. 4A-4C applies equally here and will not be repeated. Also, the reference numbers used in FIGS. 4A-4C are used for the like structures in FIG. 7.

In FIG. 7, the vibration isolator 110 can include one or more plunger impeding structures. The plunger impeding structures can be a stopper 160 (e.g., a rubber stopper)

and/or viscous fluid. The shaft 144 of the plungers 140 can be configured to pass through the plunger impeding structures.

The vibration isolator can include a first stopper 160*a*, a second stopper 160*b*, and a third stopper 160*c*. In some arrangements, the first stopper 160*a*, the second stopper 160*b*, and the third stopper 160*c* can be supported on a respective one of the landings 130*a*, 130*b*, 130*c*. In some arrangements, the first stopper 160*a*, the second stopper 160*b*, and the third stopper 160*c* can be operatively connected to a respective one of the landings 130*a*, 130*b*, 130*c*, such as by one or more fasteners, one or more adhesives, and/or one or more forms of mechanical engagement, or any combination thereof.

It will be appreciated that as the plungers 140 are depressed, the plunger impeding structures can slow the downward movement of the plungers 140. As a result, the plunger impeding structures can alter the timing of the compression of the stacks of conical springs 150 to attain desired performance characteristics.

In some arrangements, the plunger impeding structures can be substantially identical to each other. However, in other arrangements, one or more of the plunger impeding structures can be different from the other plunger impeding structures in one or more respects.

In some arrangements, each of the landings 130 can have a plunger impeding structure. However, in other arrangements, one or more of the landings 130 may not have a plunger impeding structure.

It should be noted that in some arrangements, the vibration isolator 110 can include a magnetorheological fluid (MR fluid). The MR fluid can be used in lieu of the spring members. Alternatively, the MR fluid can be used in combination with any of the arrangements shown in FIGS. 4-7 above.

Referring to FIG. 8, an example of a system 800 for vibration isolation of a seat or saddle is shown. The system 800 can be used in connection with any type of seat or saddle, such as a bicycle seat or saddle.

The system 800 can include various elements. Some of the possible elements of the system 800 are shown in FIG. 8 and will now be described. It will be understood that it is not necessary for the system 800 to have all of the elements shown in FIG. 8 or described herein. The system 800 can have any combination of the various elements shown in FIG. 8. Further, the system 800 can have additional elements to those shown in FIG. 8. In some arrangements, the system 800 may not include one or more of the elements shown in FIG. 8.

The system 800 can include one or more processors 810, one or more data stores 820, one or more sensors 830, one or more power sources 840, one or more input interfaces 850, one or more output interfaces 860, a seat or saddle system 870, one or more control modules 880, and one or more actuators 885. Each of these elements will be described in turn below.

As noted above, the system 800 can include one or more processors 810. "Processor" means any component or group of components that are configured to execute any of the processes described herein or any form of instructions to carry out such processes or cause such processes to be performed. The processor(s) 810 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 810 can include at least one hardware circuit (e.g., an integrated circuit) configured to carry out instructions contained in program code. In arrangements in which there is a plurality of processors 810, such processors can work independently from each other, or one or more processors can work in combination with each other.

The system 800 can include one or more data stores 820 for storing one or more types of data. The data store(s) 820 can include volatile and/or non-volatile memory. Examples of suitable data stores 820 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 820 can be a component of the processor(s) 810, or the data store(s) 820 can be operatively connected to the processor(s) 810 for use thereby.

The system 800 can include one or more sensors 830. "Sensor" means any device, component, and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 800 includes a plurality of sensors 830, the sensors can work independently from each other. Alternatively, two or more of the sensors can work in combination with each other. In such cases, the two or more sensors can form a sensor network. The sensor(s) 830 can be operatively connected to the processor(s) 810, the data store(s) 820, and/or other elements of the system 800 (including any of the elements shown in FIG. 8).

The sensor(s) 830 can include any suitable type of sensor. Various examples of different types of sensors will be described herein. However, it will be understood that the embodiments are not limited to the particular sensors described.

The sensor(s) 830 can include one or more weight sensors 832. The weight sensor(s) 832 can include any sensor, now known or later developed, configured to detect, determine, assess, monitor, measure, quantify, and/or sense any information or data about a weight of an occupant of the saddle 102. The weight sensor(s) 832 can be located under the saddle 102.

As noted above, the system 800 can include one or more power sources 840. The power source(s) 840 can be any power source capable of and/or configured to energize various elements, such as actuators and magnetic field generators, as will be described later. For example, the power source(s) 840 can include one or more batteries, one or more fuel cells, one or more generators, one or more alternators, one or more solar cells, and combinations thereof.

The system 800 can include one or more input interfaces 850. An "input interface" includes any device, component, system, element, or arrangement or groups thereof that enable information/data to be entered into a machine. The input interface(s) 850 can receive an input from a person (e.g., a bicycle rider). Any suitable input interface 850 can be used, including, for example, a keypad, display, touch screen, multi-touch screen, switch, button, joystick, mouse, trackball, microphone, and/or combinations thereof.

The system 800 can include one or more output interfaces 860. An "output interface" includes any device, component, system, element, or arrangement or groups thereof that enable information/data to be presented to a person. The output interface(s) 860 can present information/data to an occupant of the saddle 102. The output interface(s) 860 can include a display, an earphone, and/or a speaker. Some components of the system 800 may serve as both a component of the input interface(s) 850 and a component of the output interface(s) 860.

The system 800 can include a seat or saddle system 870. The saddle system 870 can include a seat or a saddle and a vibration isolator. The above description of the saddle 102 and the vibration isolator 110 applies equally to the same elements in the saddle system 870.

The system 800 can include one or more actuators 885. The actuator(s) 885 can be operatively connected to effect various things. For instance, the actuator(s) 885 can be operatively connected to cause movement of one or more of the landings 130. The actuator(s) 885 can be operatively connected to one or more of the landings 130. In one or more arrangements, the actuator(s) 885 can include servo motors, pneumatic actuators, hydraulic pistons, relays, solenoids, and/or piezoelectric actuators, just to name a few possibilities. The actuator(s) 885 can include piston(s), push and/or pull bar(s) or rod(s), pulley(s), gear(s), gear track(s), and/or magnet(s), just to name a few possibilities. The actuator(s) 885 can include any combination of the above. The actuator(s) 885 can be selectively activated to cause one or more of the landings 130 to be moved into and out of various positions. In one or more arrangements, the actuator(s) 885 can be activated responsive to receiving signals or other inputs from the control module(s) 880 and/or from a user (e.g., via the input interface(s) 850).

The system 800 can include one or more modules, at least some of which will be described herein. The modules can be implemented as computer readable program code that, when executed by a processor, implement one or more of the various processes described herein. One or more of the modules can be a component of the processor(s) 810, or one or more of the modules can be executed on and/or distributed among other processing systems to which the processor(s) 810 is operatively connected. The modules can include instructions (e.g., program logic) executable by one or more processor(s) 810. Alternatively or in addition, one or more data stores 820 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 800 can include one or more control modules 880. The control module(s) 880 can include profiles and logic for actively controlling the stiffness characteristics of the vibration isolator 110. The control module(s) 880 can be configured to determine when the stiffness characteristics of the vibration isolator 110, such as the stiffness profile, should be adjusted. The control module(s) 880 can be configured to do so in any suitable manner. For instance, the control module(s) 880 can be configured to analyze data or information acquired by the sensor(s) 830 (e.g., the weight sensor(s) 832 and/or other sensors). The control module(s) 880 can retrieve raw data from the sensor(s) 830 and/or from the data store(s) 820. The control module(s) 880 can use profiles, parameters, or settings loaded into the control module(s) 880 and/or stored in the data store(s) 820. Alternatively or additionally, the control module(s) 880 can be configured to detect user inputs (e.g., commands) provided on the input interface(s) 850.

The control module(s) 880 can analyze the sensor data to determine an appropriate action for adjusting the performance characteristics of the vibration isolator 110. The control module(s) 880 can be configured to cause the stiffness of the vibration isolator 110 to be adjusted. As used herein, "cause" or "causing" means to make, force, compel, direct, command, instruct, and/or enable an event or action to occur or at least be in a state where such event or action may occur, either in a direct or indirect manner.

For instance, the control module(s) 880 can cause one or more landings 130 of the vibration isolator 110 to be moved out of the way. For instance, the control module(s) 880 can activate one or more of the actuators 885, which can cause the landings 130 to be moved out of the way. As a result, the conical springs 150 associated with the landing(s) 130 that have been moved do not contribute to the performance of the vibration isolator 110. In some arrangements, the control module(s) 880 can be configured to selectively permit, restrict, adjust, alter, and/or prevent the flow of electrical energy from the power source(s) 840 to the actuator(s) 885. The control module(s) 880 can be configured to send control signals or commands over a communication network 890 to the actuator(s) 885 or to other elements of the system 800.

The control module(s) 880 can be configured to cause the stiffness characteristics of the vibration isolator 110 to be adjusted based on one or more parameters. For instance, the control module(s) 880 can be configured to cause the stiffness characteristics of the vibration isolator 110 to be adjusted based on real-time conditions as detected by the sensor(s) 830, such as seat occupant weight. Based on such real-time conditions, the control module(s) 880 can determine suitable stiffness characteristics for the vibration isolator 110. The control module(s) 880 can query the data store(s) 820 for data about the conical springs 150. For instance, the control module(s) 880 can query spring member data 822, such as the stress-strain curves for the conical springs 150, including the performance characteristics based on how many stacks of spring members are used. The control module(s) 880 can be configured to select or determine an appropriate number of stacks of conical springs 150 to achieve a desired stiffness characteristic.

The selective varying of the stiffness characteristics of the vibration isolator 110 can be performed at any suitable time. For instance, the selective varying can be performed continuously, periodically, irregularly, or even randomly.

In some instances, the control module(s) 880 can be configured to cause the stiffness characteristics of the vibration isolator 110 to be selectively adjusted based on user inputs (e.g., commands). For instance, a user can provide an input on the input interface(s) 850. The input can be to adjust the stiffness characteristics of the vibration isolator 110. The control module(s) 880 can be configured to cause the stiffness characteristics of the vibration isolator 110 to be adjusted in accordance with the user input.

In some arrangements, the control module(s) 880 can be configured to selectively activate and deactivate the magnetic field generator 155 associated with the vibration isolator 110 (see FIG. 5). The control module(s) 880 can be configured to vary the strength of the magnetic field produced by the magnetic field generator 155. In some arrangements, the control module(s) 880 can be configured to selectively permit, restrict, adjust, alter, and/or prevent the flow of electrical energy from the power source(s) 840 to the actuator(s) 885. The control module(s) 880 can be configured to send control signals or commands over a communication network 890 to the actuator(s) 885 or to other elements of the system 800. In some arrangements, the control module(s) 880 can be configured to vary the strength of the magnetic field produced by the magnetic field generator 155 based on a weight of an occupant of the saddle 102. Such weight can be determined by the weight sensor(s) 832.

The various elements of the system 800 can be communicatively linked to one another or one or more other elements through one or more communication networks 890. As used herein, the term "communicatively linked" can include direct or indirect connections through a communication channel, bus, pathway, or another component or system. A "communication network" means one or more components designed to transmit and/or receive information from one source to another. The data store(s) 820 and/or one or more other elements of the system 800 can include and/or execute suitable communication software, which enables the various elements to communicate with each other through the communication network and perform the functions disclosed herein.

The one or more communication networks 890 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Figure 13:
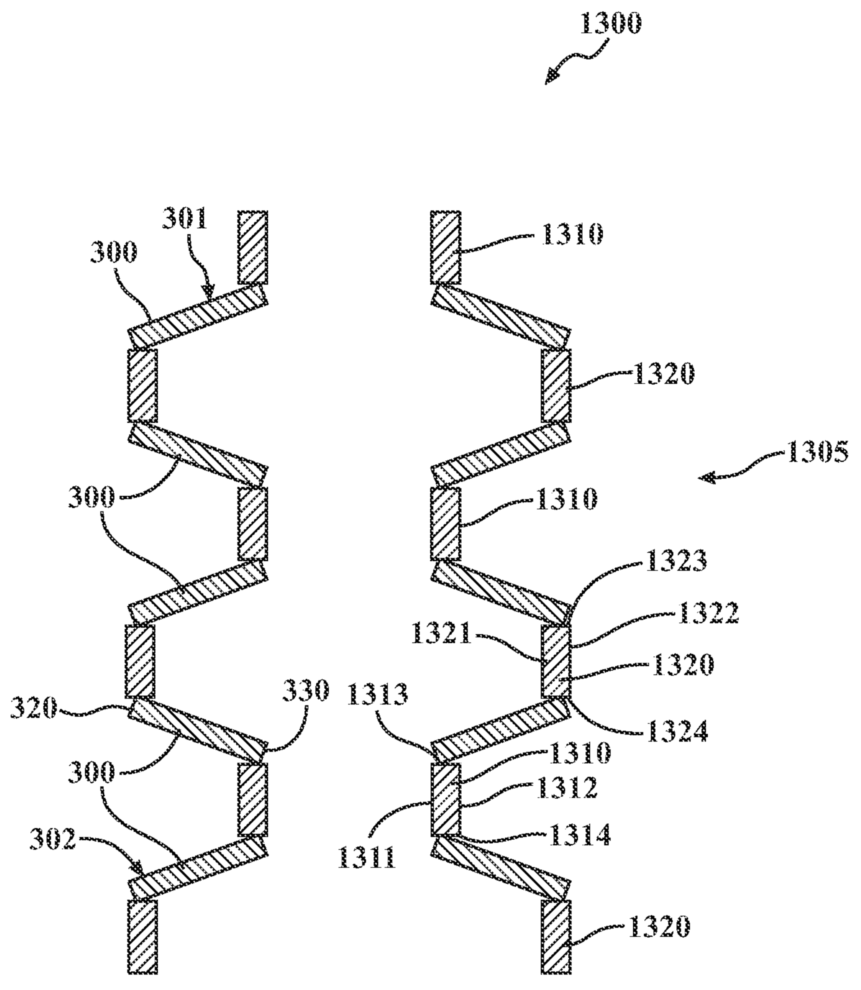
FIG. 13 is a cross-sectional view of an example of a stack of conical springs for use in a vibration isolator, showing an alternating single conical spring configuration with low profile spacers.

Additional stacks of conical springs will now be described. Referring to FIG. 13, an example of an arrangement 1300 of spring members for use in a vibration isolator is shown in a cross-sectional view. The arrangement 1300 can include a plurality of the conical springs 300 arranged in a stack 1305. The stack 1305 of the plurality of the conical springs 300 can have a first outermost conical spring 301 and a second outermost conical spring 302.

The conical springs 300 can be arranged in an alternating single conical spring configuration. Thus, the outer diameter body portion 320 of one conical spring 300 can face the outer diameter body portion 320 of a neighboring one of the conical springs 300. The neighboring conical springs 300 can be separated from each other by spacers, as will be described below. It will be appreciated that the outer diameter body portion 320 of the outermost conical springs 301, 302 may or may not face another one of the conical springs 300. For example, in the particular arrangement shown in FIG. 13, the outer diameter body portion 320 of the second outermost conical spring 302 does not face another one of the conical springs 300.

Further, the inner diameter body portion 330 of one conical spring 300 can face the inner diameter body portion 330 of a neighboring one of the conical springs 300. It will be appreciated that the inner diameter body portion 330 of the outermost conical springs 301, 302 may or may not face another one of the conical springs 300. For example, in the particular arrangement shown in FIG. 13, the inner diameter body portion 330 of the first outermost conical spring 301 does not face another one of the conical springs 300.

The arrangement 1300 can further include a plurality of inner spacers 1310 and a plurality of outer spacers 1320. The inner spacers 1310 can separate the inner diameter body portion 330 of neighboring conical springs 300. The outer spacers 1320 can separate the outer diameter body portion 320 of neighboring conical springs 300. In some arrangements, the plurality of inner spacers 1310 can be substantially identical to each other. In other arrangements, at least one of the inner spacers 1310 can be different from the other inner spacers 1310 in one or more respects. In some arrangements, the plurality of outer spacers 1320 can be substantially identical to each other. In other arrangements, at least one of the outer spacers 1320 can be different from the other outer spacers 1320 in one or more respects.

The inner spacers 1310 and the outer spacers 1320 can be generally cylindrical members. In one or more arrangements, the inner spacers 1310 and the outer spacers 1320 can have a substantially rectangular shaped cross-sectional shape. Thus, the inner spacers 1310 can include an inner wall 1311, an outer wall 1312, a first ledge 1313, and a second ledge 1314. The outer spacers 1320 can include an inner wall 1321, an outer wall 1322, a first ledge 1323, and a second ledge 1324.

The inner spacers 1310 and the outer spacers 1320 can be configured as non-locking spacers. Thus, the outer diameter body portion 320 of the conical springs 300 can rest on or contact the first ledge 1323 or the second ledge 1324 of the outer spacers 1320. Similarly, the inner diameter body portion 330 can rest on or contact the first ledge 1313 or the second ledge 1314 of the inner spacers 1310. Thus, the inner spacers 1310 and the outer spacers 1320 do not lockingly engage the conical springs 300. As a result, the stack 1305 may not, in and of itself, have any lateral load bearing capability.

The inner spacers 1310 and/or the outer spacers 1320 can be low profile spacers. In such case, the inner spacers 1310 do not extend beyond or do not extend substantially beyond the inner diameter body portion 330 of the conical springs 300. The inner wall 1311 of the inner spacers 1310 can be substantially aligned or substantially flush with the inner diameter body portion 330 of the conical springs 300. The outer spacers 1320 do not extend beyond or do not extend substantially beyond the outer diameter body portion 320 of the conical springs 300. The outer wall 1322 of the outer spacers 1320 can be substantially aligned or substantially flush with the outer diameter body portion 320 of the conical springs 300.

FIG. 13 shows the conical springs 300 in the stack 1305 as being in a neutral position. However, as will be explained in more detail later, the arrangement 1300 can be configured to allow the conical springs 300 in the stack 1305 to become flat or even inverted.

Figure 14:
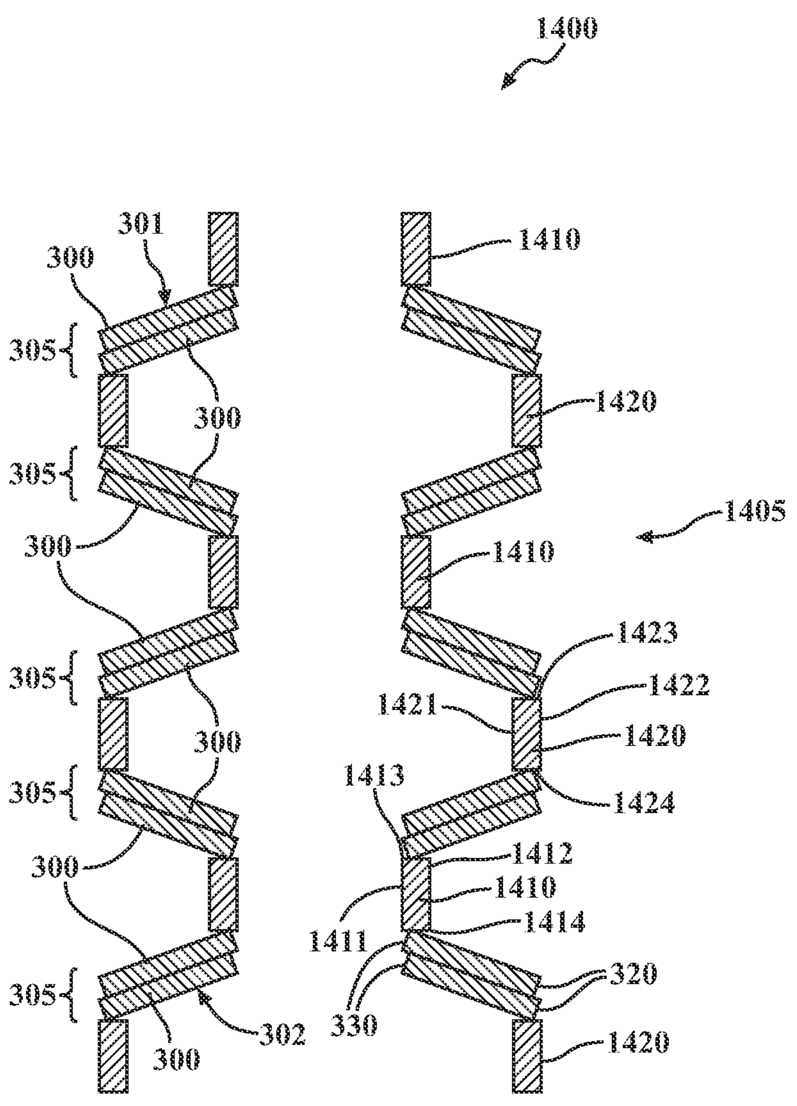
FIG. 14 is a cross-sectional view of an example of a stack of conical springs for use in a vibration isolator, showing an alternating double conical spring configuration with low profile spacers.

Referring to FIG. 14, an example of an arrangement 1400 of spring members for use in a vibration isolator is shown in a cross-sectional view. The arrangement 1400 can include a plurality of the conical springs 300 arranged in a stack 1405. The stack 1405 of the plurality of the conical springs 300 can have a first outermost conical spring 301 and a second outermost conical spring 302.

The conical springs 300 can be arranged in an alternating double conical spring configuration. Here, the conical springs 300 can be arranged in sets 305 of a plurality of conical springs 300. In the example shown, each set 305 can include two conical springs 300. The two conical springs 300 can be in a nested or stacked configuration. However, it will be appreciated that the "set" can have any quantity of conical springs. It will be appreciated that double stacking the conical springs 300 can result in a doubling of the spring force.

Thus, the outer diameter body portion 320 of one set 305 of conical springs 300 can face the outer diameter body portion 320 of a neighboring set 305 of the conical springs 300. The neighboring sets 305 of the conical springs 300 can be separated from each other by spacers, as will be described below.

It will be appreciated that the outer diameter body portion 320 of the first and second outermost conical springs 301, 302 may or may not face another conical spring 300 or pair of conical springs 300. For example, in the particular arrangement shown in FIG. 14, the outer diameter body portion 320 of the second outermost conical spring 302 does not face another conical spring 300 or pair of conical springs 300. Likewise, the inner diameter body portion 330 of the first outermost conical spring 301 does not face another conical spring 300 or pair of conical springs 300.

The arrangement 1400 can further include a plurality of inner spacers 1410 and a plurality of outer spacers 1420. The inner spacers 1410 can separate the inner diameter body portion 330 of neighboring pairs of the conical springs 300. The outer spacers 1420 can separate the outer diameter body portion 320 of neighboring pairs of the conical springs 300. In some arrangements, the plurality of inner spacers 1410 can be substantially identical to each other. In other arrangements, at least one of the inner spacers 1410 can be different from the other inner spacers 1410 in one or more respects. In some arrangements, the plurality of outer spacers 1420 can be substantially identical to each other. In other arrangements, at least one of the outer spacers 1420 can be different from the other outer spacers 1420 in one or more respects.

The inner spacers 1410 and the outer spacers 1420 can be generally cylindrical members. In one or more arrangements, the inner spacers 1410 and the outer spacers 1420 can have a substantially rectangular shaped cross-sectional shape. Thus, the inner spacers 1410 can include an inner wall 1411, an outer wall 1412, a first ledge 1413, and a second ledge 1414. The outer spacers 1420 can include an inner wall 1421, an outer wall 1422, a first ledge 1423, and a second ledge 1424.

The inner spacers 1410 and the outer spacers 1420 can be configured as non-locking spacers. Thus, the outer diameter body portion 320 of one of the conical springs 300 of a set 305 can rest on or contact the first ledge 1423 or the second ledge 1424 of the outer spacers 1420. Similarly, the inner diameter body portion 330 of one conical spring 300 of a set 305 can rest on or contact the first ledge 1413 or the second ledge 1414 of the inner spacers 1410. Thus, the inner spacers 1410 and the outer spacers 1420 do not lockingly engage the conical springs 300. As a result, the stack 1405 may not, in and of itself, have any lateral load bearing capability.

The inner spacers 1410 and/or the outer spacers 1420 can be low profile spacers. In such case, the inner spacers 1410 do not extend beyond or do not extend substantially beyond the inner diameter body portion 330 of the conical springs 300. The inner wall 1411 of the inner spacers 1410 can be substantially aligned or substantially flush with the inner diameter body portion 330 of the conical springs 300. The outer spacers 1420 do not extend beyond or do not extend substantially beyond the outer diameter body portion 320 of the conical springs 300. The outer wall 1422 of the outer spacers 1420 can be substantially aligned or substantially flush with the outer diameter body portion 320 of the conical springs 300.

FIG. 14 shows the pairs of conical springs 300 in the stack 1405 as being in a neutral position. However, as will be explained in more detail later, the arrangement 1400 can be configured to allow the sets 305 of conical springs 300 in the stack 1405 to become flat or even inverted.

Figures 15, 16:
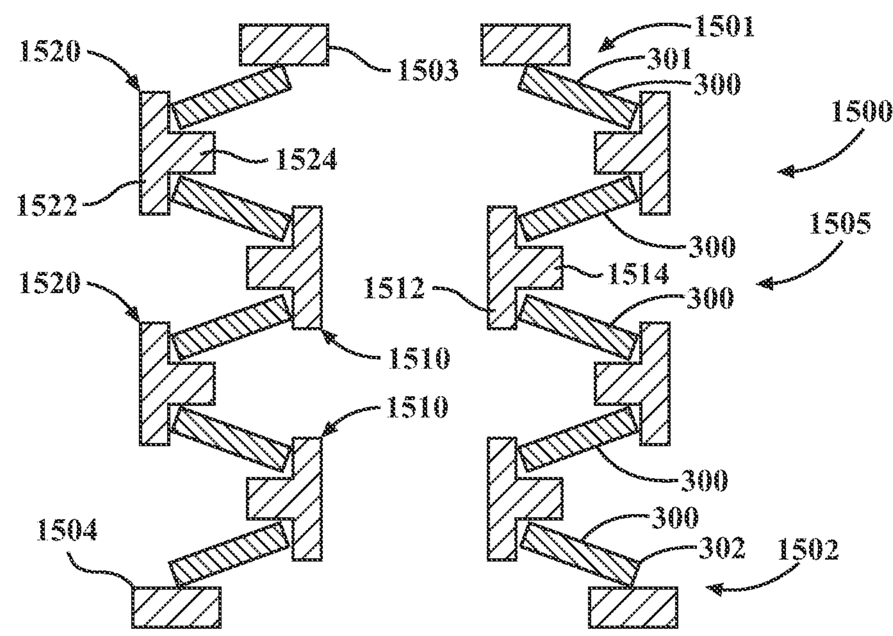
FIG. 15 is a cross-sectional view of an example of a stack of conical springs for use in a vibration isolator, showing an alternating single conical spring configuration with non-locking spacers.
FIG. 16 is a cross-sectional view of an example of a stack of conical springs for use in a vibration isolator, showing an alternating single conical spring configuration with locking spacers.

Referring to FIG. 15, an example of an arrangement 1500 of spring members for use in a vibration isolator is shown in a cross-sectional view. The arrangement 1500 can include a plurality of the conical springs 300 arranged in a stack 1505. The stack 1505 of the plurality of the conical springs 300 can have a first outermost conical spring 301 and a second outermost conical spring 302. In some instances, the arrangement 1500 can be used within the seat post 106, 1906. In other instances, the arrangement 1500 can be used outside of the seat post 106, 1906.

The arrangement 1500 can further include a plurality of inner spacers 1510 and a plurality of outer spacers 1520. In some instances, the arrangement 1500 can include end caps or end spacers 1503, 1504 at the opposite ends of the stack 1505. The inner spacers 1510 can separate the inner diameter body portion 330 of neighboring pairs of the conical springs 300. The outer spacers 1520 can separate the outer diameter body portion 320 of neighboring pairs of the conical springs 300. In some arrangements, the plurality of inner spacers 1510 can be substantially identical to each other. In other arrangements, at least one of the inner spacers 1510 can be different from the other inner spacers 1510 in one or more respects. In some arrangements, the plurality of outer spacers 1520 can be substantially identical to each other. In other arrangements, at least one of the outer spacers 1520 can be different from the other outer spacers 1520 in one or more respects.

The inner spacers 1510 and the outer spacers 1520 can be generally cylindrical members. In one or more arrangements, the inner spacers 1510 and the outer spacers 1520 can have a substantially t-shaped cross-sectional shape. Thus, the inner spacers 1510 can include an inner wall portion 1512 and a transverse ledge portion 1514. The transverse ledge portion 1514 can extend outwardly from the inner wall portion 1512. The transverse ledge portion 1514 can be substantially perpendicular to the inner wall portion 1512. The outer spacers 1520 can include an outer wall portion 1522 and a transverse ledge portion 1524. The transverse ledge portion 1524 can extend inwardly from the outer wall portion 1522. The transverse ledge portion 1524 can be substantially perpendicular to the outer wall portion 1522.

The inner spacers 1510 and the outer spacers 1520 can be configured as non-locking spacers. Thus, the outer diameter body portion 320 of the conical springs 300 can rest on or contact the transverse ledge portion 1524 of the outer spacers 1520. Similarly, the inner diameter body portion 330 can rest on or contact the transverse ledge portion 1514 of the inner spacers 1510. Thus, the inner spacers 1510 and the outer spacers 1520 do not lockingly engage the conical springs 300.

In some instances, the arrangement 1500 can include a first endcap 1503 and a second endcap 1504. The first endcap 1503 can be operatively connected to and/or operatively positioned with respect to the first outermost conical spring 301 at a first end 1501 of the stack 1505. In some arrangements, one or more intermediate structures can be located between the first endcap 1503 and the first outermost conical spring 301. In other arrangements, the first endcap 1503 and the first outermost conical spring 301 can directly contact each other. The second endcap 1504 can be operatively connected to and/or operatively positioned with respect to the second outermost conical spring 302 at a second end 1502 of the stack 1505. In some arrangements, one or more intermediate structures can be located between the second endcap 1504 and the second outermost conical spring 302. In other arrangements, the second endcap 1504 and the second outermost conical spring 302 can directly contact each other.

The first endcap 1503 and the second endcap 1504 can have any suitable size, shape, and/or configuration. In some arrangements, the first endcap 1503 and the second endcap 1504 can be substantially identical to each other. In other arrangements, the first endcap 1503 and the second endcap 1504 can be different from each other in one or more respects. The first endcap 1503 and the second endcap 1504 can be made of any suitable material.

FIG. 15 shows the conical springs 300 in the stack 1505 as being in a neutral position. However, as will be explained in more detail later, the stack 1505 can be configured to allow the conical springs 300 in the stack 1505 to become flat or even inverted.

Referring to FIG. 16, an example of an arrangement 1600 of spring members for use in a vibration isolator is shown in a cross-sectional view. The arrangement 1600 can include a plurality of the conical springs 300 arranged in a stack 1605. The stack 1605 of the plurality of the conical springs 300 can have a first outermost conical spring 301 and a second outermost conical spring 302.

The arrangement 1600 can further include a plurality of inner spacers 1610 and a plurality of outer spacers 1620. In some instances, the arrangement 1600 can include end caps or end spacers 1603, 1604 at the opposite ends of the stack 1605. The inner spacers 1610 can separate the inner diameter body portion 330 of neighboring pairs of the conical springs 300. The outer spacers 1620 can separate the outer diameter body portion 320 of neighboring pairs of the conical springs 300. In some arrangements, the plurality of inner spacers 1610 can be substantially identical to each other. In other arrangements, at least one of the inner spacers 1610 can be different from the other inner spacers 1610 in one or more respects. In some arrangements, the plurality of outer spacers 1620 can be substantially identical to each other. In other arrangements, at least one of the outer spacers 1620 can be different from the other outer spacers 1620 in one or more respects.

The inner spacers 1610 and the outer spacers 1620 can be generally cylindrical members. In one or more arrangements, the inner spacers 1610 and the outer spacers 1620 can have a substantially E-shaped or a substantially 3-shaped cross-sectional shape. Thus, the inner spacers 1610 can include an inner wall portion 1612, a central transverse ledge portion 1614, an upper transverse ledge portion 1616, and a lower transverse ledge portion 1618. It will be appreciated that the terms "upper" and "lower" are used for convenience in this respect relative to the orientation of the inner spacers 1610 shown in FIG. 16. However, it will be appreciated that the upper transverse ledge portion 1616 and the lower transverse ledge portion 1618 may not actually be above or below the central transverse ledge portion 1614 depending on the orientation of the arrangement 1600 or the vibration isolator in which the arrangement 1600 is used. A first groove 1611 can be defined by the inner wall portion 1612, the central transverse ledge portion 1614, and the upper transverse ledge portion 1616. A second groove 1613 can be defined by the inner wall portion 1612, the central transverse ledge portion 1614, and the lower transverse ledge portion 1618.

The central transverse ledge portion 1614 can extend outwardly from the inner wall portion 1612. The central transverse ledge portion 1614 can be substantially perpendicular to the inner wall portion 1612. In some arrangements, the upper transverse ledge portion 1616 and the lower transverse ledge portion 1618 can be non-parallel to the central transverse ledge portion 1614. In some arrangements, the upper transverse ledge portion 1616 and the lower transverse ledge portion 1618 can be non-parallel to each other.

The outer spacers 1620 can include an outer wall portion 1622, a central transverse ledge portion 1624, an upper transverse ledge portion 1626, and a lower transverse ledge portion 1628. Again, the terms "upper" and "lower" are used merely for convenience in this respect relative to the orientation of the inner spacers 1610 shown in FIG. 16. A first groove 1621 can be defined by the outer wall portion 1622, the central transverse ledge portion 1624, and the upper transverse ledge portion 1626. A second groove 1623 can be defined by the outer wall portion 1622, the central transverse ledge portion 1624, and the lower transverse ledge portion 1628.

The central transverse ledge portion 1624 can extend outwardly from the outer wall portion 1622. The central transverse ledge portion 1624 can be substantially perpendicular to the outer wall portion 1622. In some arrangements, the upper transverse ledge portion 1626 and the lower transverse ledge portion 1628 can be non-parallel to the central transverse ledge portion 1624. In some arrangements, the upper transverse ledge portion 1626 and the lower transverse ledge portion 1628 can be non-parallel to each other.

The inner spacers 1610 and the outer spacers 1620 can be configured as locking spacers. The outer diameter body portion 320 of the conical springs 300 can be received in one of the first groove 1621 and the second groove 1623 of the outer spacer 1620. Thus, the outer diameter body portion 320 of the conical springs 300 can be lockingly engaged by and/or retainably received in the respective one of the first groove 1621 and the second groove 1623 of the outer spacer 1620. Similarly, the inner diameter body portion 330 of the conical springs 300 can be received in one of the first groove 1611 and the second groove 1613 of the inner spacer 1610. Thus, the inner diameter body portion 330 of the conical springs 300 can be lockingly engaged by and/or retainably received in the respective one of the first groove 1611 and the second groove 1613 of the inner spacer 1610.

The arrangement 1600 can include a first endcap 1603 and a second endcap 1604. The first endcap 1603 can be operatively connected to and/or operatively positioned with respect to the first outermost conical spring 301 at a first end 1601 of the stack 1605. In some arrangements, one or more intermediate structures can be located between the first endcap 1603 and the first outermost conical spring 301. In other arrangements, the first endcap 1603 and the first outermost conical spring 301 can directly contact each other. The second endcap 1604 can be operatively connected to and/or operatively positioned with respect to the second outermost conical spring 302 at a second end 1602 of the stack 1605. In some arrangements, one or more intermediate structures can be located between the second endcap 1604 and the second outermost conical spring 302. In other arrangements, the second endcap 1604 and the second outermost conical spring 302 can directly contact each other.

The first endcap 1603 and the second endcap 1604 can have any suitable size, shape, and/or configuration. In some arrangements, the first endcap 1603 and the second endcap 1604 can be substantially identical to each other. In other arrangements, the first endcap 1603 and the second endcap 1604 can be different from each other in one or more respects. The first endcap 1603 and the second endcap 1604 can be made of any suitable material.

FIG. 16 shows the conical springs 300 in the stack 1605 as being in a neutral position. However, as will be explained in more detail later, the stack 1605 can be configured to allow the conical springs 300 in the stack 1605 to become flat or even inverted.

FIG. 15 shows an example in which the inner spacers 1510 and the outer spacers 1520 are non-locking spacers, and FIG. 16 shows an example in which the inner spacers 1610 and the outer spacers 1620 are locking spacers. However, it will be understood that arrangements described herein are not limited in this regard. Indeed, the vibration isolators can use any combination of locking, non-locking spacers, and/or other types of spacers for the inner spacers and/or the outer spacers. For example, the inner spacers can be locking spacers, and the outer spacers can be non-locking spacers, or vice versa. As another example, the inner spacers can be all locking spacers, all non-locking spacers, or any combination of locking spacers and non-locking spacers. Similarly, the outer spacers can be all locking spacers, all non-locking spacers, or any combination of locking spacers and non-locking spacers.

Further, it will be appreciated that other arrangements of spring members can be used. Indeed, additional examples of spring member arrangements and/or vibration isolators can include any of those disclosed in U.S. Pat. Nos. 10,371,229; 10,677,310; and 11,137,045, which are incorporated herein by reference in their entireties.

Figure 17:
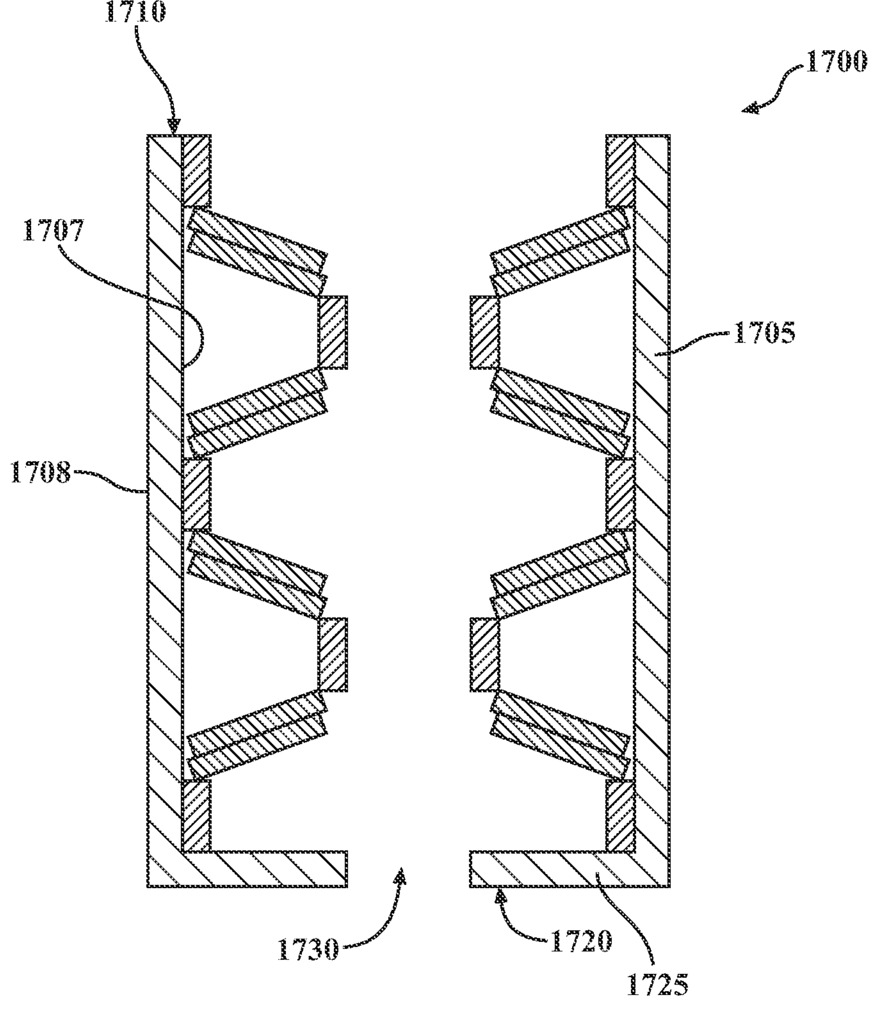
FIG. 17 is an example of a vibration isolator cartridge with a stack of conical springs disposed therein.

As noted above, the various arrangements of spring members can be used in connection with a vibration isolator. Referring to FIG. 17, an example of a vibration isolator cartridge 1700 is shown. The vibration isolator cartridge 1700 can include a housing 1705. The housing 1705 can have any suitable size, shape, and/or configuration. In one or more arrangements, the housing 1705 can be substantially cylindrical in shape. The housing 1705 can be sized to be received in another structure, such as a seat post or other portion of a bicycle. The housing 1705 can be made of any suitable material, including metal or plastics, just to name a few possibilities.

The housing 1705 can have an inner wall 1707 and an outer wall 1708. The housing 1705 can include an upper end 1710 and a lower end 1720. It will be appreciated that the terms "upper" and "lower" are used for convenience in this respect relative to the orientation of the vibration isolator cartridge 1700 shown in FIG. 17 and are not intended to be limiting. Of course, when the vibration isolator cartridge 1700 is in use, it can have any suitable orientation. The upper end 1710 can be open. The lower end 1720 can be at least partially open, such as by an aperture 1730 defined therein. The lower end 1720 can include a lower wall portion 1725.

A plurality of conical springs can be operatively positioned within the housing 1705. In the example shown in FIG. 17, a plurality of conical springs can be arranged in a stack in an alternating double conical spring configuration, similar to that shown in FIG. 14. With such an arrangement of the plurality of conical springs, it will be appreciated that the outer diameter body portion of the conical springs and the outer spacers can be adjacent to an inner wall of the housing. Thus, it will be appreciated that the inner wall 1707 of the housing 1705 can keep the plurality of conical springs substantially concentrically aligned. The housing 1705 can provide lateral support for the stack of the conical springs.

The vibration isolator cartridge 1700 can also include a plunger. The plunger can be configured to compress the stack of conical springs, as will be described herein. For clarity, the plunger is not shown in FIG. 17.

Figure 18A:
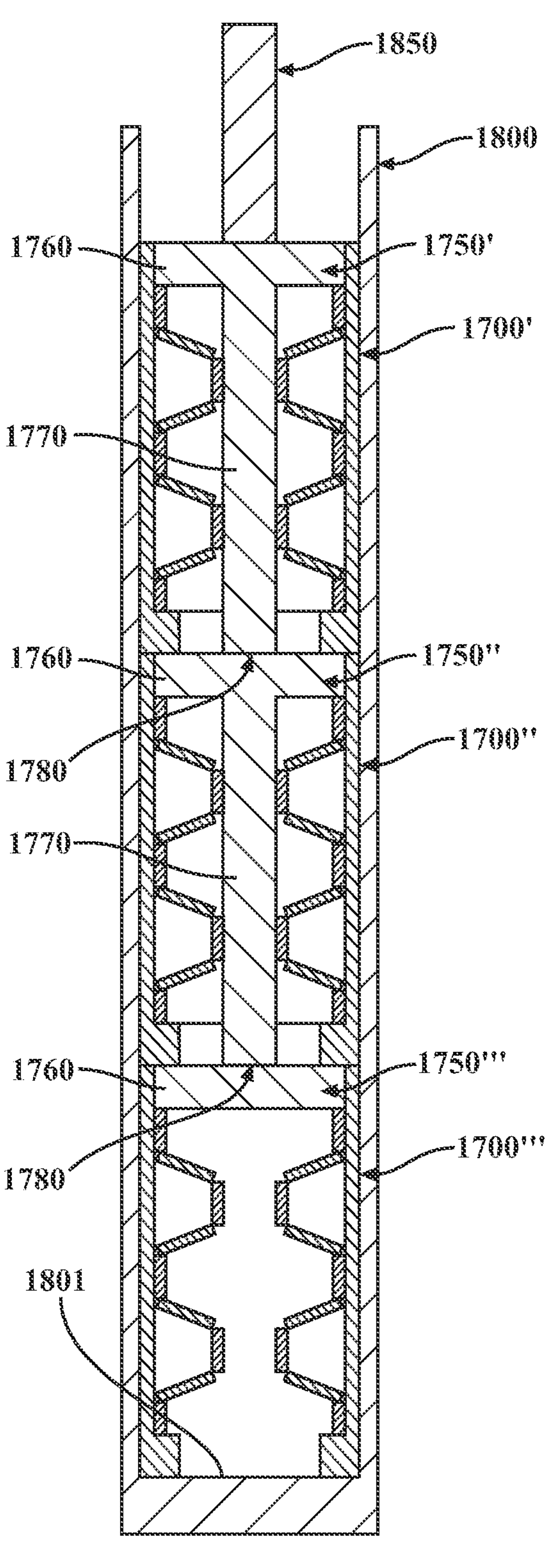
FIG. 18A is a cross-sectional view of a portion of a bicycle, showing a plurality of isolator cartridges stacked within a seat post for a bicycle saddle, the plurality of isolator cartridges being in a non-compressed condition.

The vibration isolator cartridges 1700 can be used in any application in which vibration isolation is desired. For instance, the vibration isolator cartridges 1700 can be used in connection with bicycles. FIG. 18A is a cross-sectional view of a portion of a bicycle. More particularly, FIG. 18A shows a plurality of vibration isolator cartridges 1700', 1700", 1700'" stacked within a seat post 1800 for a bicycle saddle. The vibration isolator cartridges 1700', 1700", 1700'" can be stacked in an end-to-end manner. Thus, the lower end 1720 of the vibration isolator cartridge 1700' can contact and/or can be supported on the upper end 1710 of the vibration isolator cartridge 1700", and the lower end 1720 of the vibration isolator cartridge 1700" can contact and/or be supported on the upper end 1710 of the vibration isolator cartridge 1700'".

As noted above, each of the vibration isolator cartridges 1700', 1700", 1700'" can include a plunger 1750', 1750", 1750'", respectively. The plungers 1750', 1750", 1750'" can be any movable structure and can have any suitable configuration. For instance, in one or more arrangements, one or more of the plungers 1750', 1750", 1750'" can include a head 1760 and a shaft 1770. The shaft 1770 can extend from the head 1760. The shaft 1770 can extend to a distal end 1780. The shaft 1770 can pass through the interior of the stack of the conical springs 300 in the vibration isolator cartridges 1700', 1700", 1700'".

In some instances, one or more of the plungers may only include the head 1760. The plunger 1750' is an example of such a plunger. The vibration isolator cartridge 1700'" is the lowermost cartridge in the stack of vibration isolator cartridges. As such, a shaft is not needed on the plunger 1750'" because there are no further plungers to depress. Also, a shaft would bottom out on a bottom 1801 of the seat post 1800.

The head 1760 can have any suitable size, shape, and/or configuration. The shaft 1770 can have any suitable size, shape, and/or configuration. The head 1760 and the shaft 1770 can be a unitary structure, or they can be separate pieces subsequently joined together. In some arrangements, the head 1760 can be substantially circular, rectangular, polygonal, or triangular in conformation. In some arrangements, the shaft 1770 can have a substantially circular, rectangular, polygonal, or triangular cross-sectional shape. In some arrangements, the shafts 1770 of the plungers 1750 can be substantially aligned with each other within the vibration isolator cartridge 1700.

The plungers 1750 can be substantially identical to each other. Alternatively, one or more of the plungers 1750 can be different from the other plungers 1750 in one or more respects, including, for example, head width, head shape, head thickness, shaft length, shaft diameter or width, and/or shaft cross-sectional shape.

In some arrangements, the head 1760 and a portion of the shaft 1770 of the plunger 1750 can extend outside of the housing 1705. This exposed portion of the plunger 1750 can engage with the engaging structure 1850. However, in some arrangements, the head 1760 of the plunger 1750 associated with the uppermost vibration isolator cartridge can be substantially flush with the upper end 1710 of the housing 1705. In some arrangements, the head 1760 of the plunger 1750 associated with the uppermost vibration isolator cartridge can be recessed from the upper end 1710 of the housing 1705. The plungers 1750 can be made of any suitable material, including, for example, metals or plastics.

It will be appreciated that the modular configuration of the vibration isolator cartridges 1700', 1700", 1700''' can allow a suitable plunger to be used as appropriate and can allow the plungers to be readily removed and/or exchanged. Likewise, the vibration isolator cartridges 1700', 1700", 1700''' can allow a suitable stack of conical springs to be used as appropriate. The vibration isolator cartridges 1700', 1700", 1700''' can be readily added, removed, and/or exchanged. In some arrangements, the bottom 1801 of the seat post 1800 can be removable and/or configured to allow access to the interior of the seat post 1800. As an example, there can be a nut or other closure element at the bottom 1801 of the seat post 1800 that can be unscrewed to permit access to the interior of the seat post 1800. Once removed, the vibration isolator cartridges can be removed or inserted into the seat post 1800.

FIG. 18A shows the vibration isolator cartridges 1700', 1700", 1700''' in a neutral or non-activated configuration. In the non-activated configuration, the distal ends 1780 of the shafts 1770 can be adjacent to, be slightly spaced a distance from, or be in contact with the respective head 1760 of a neighboring plunger 1750.

When a load is imposed upon the head 1760 of the plunger 1750' of the vibration isolator cartridge 1700', such as from the engaging structure 1850, the plunger 1750' can be moved downwardly. The distal end 1780 of the shaft 1770 of the plunger 1750' can come into contact with the head 1760 of the plunger 1750", or it may start to depress the head 1760 of the plunger 1750". The distal end 1780 of the shaft 1770 of the plunger 1750' can pass through the aperture 1730 in the lower end 1720 of the housing 1705 of the vibration isolator cartridge 1700'. As the plunger 1750' moves further downwardly, the head 1760 of the plunger 1750" will be moved downwardly. The distal end 1780 of the shaft 1770 of the plunger 1750" can come into contact with the head 1760 of the plunger 1750''', or it may start to depress the head 1760 of the plunger 1750'''. As the plunger 1750" moves further downwardly, the head 1760 of the plunger 1750''' will be moved downwardly. In some arrangements, the plungers 1750', 1750", 1750''' can be depressed simultaneously or substantially simultaneously.

Figure 18B:
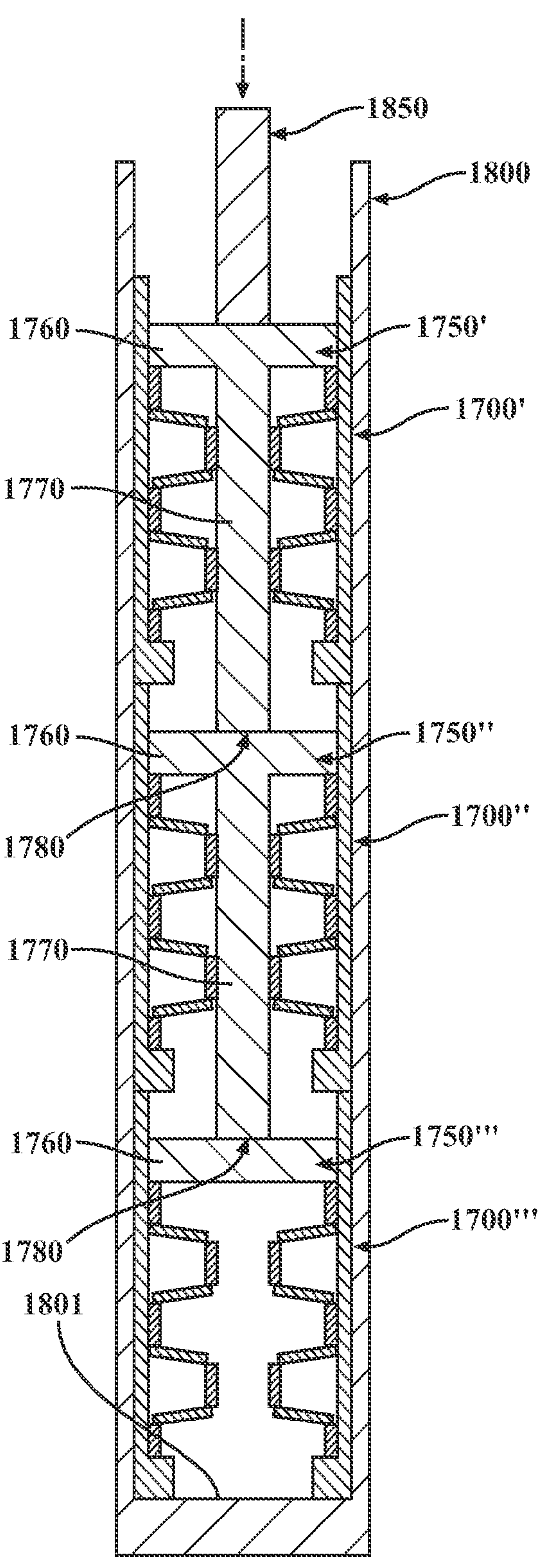
FIG. 18B is a cross-sectional view of a portion of a bicycle, showing the plurality of isolator cartridges in a compressed condition.

As a result, the stack of conical springs in each of the vibration isolator cartridges 1700', 1700", 1700''' can be compressed. FIG. 18B shows an example of the compression of the stacks of conical springs. As the conical springs are compressed, the vibration isolator cartridges 1700', 1700", 1700''' can be in the different stiffness regions of the force-deflection curve, as will be explained in more detail below. In some arrangements, the stack of conical springs in each of the vibration isolator cartridges 1700', 1700", 1700''' can be compressed simultaneously or substantially simultaneously.

Figure 19:
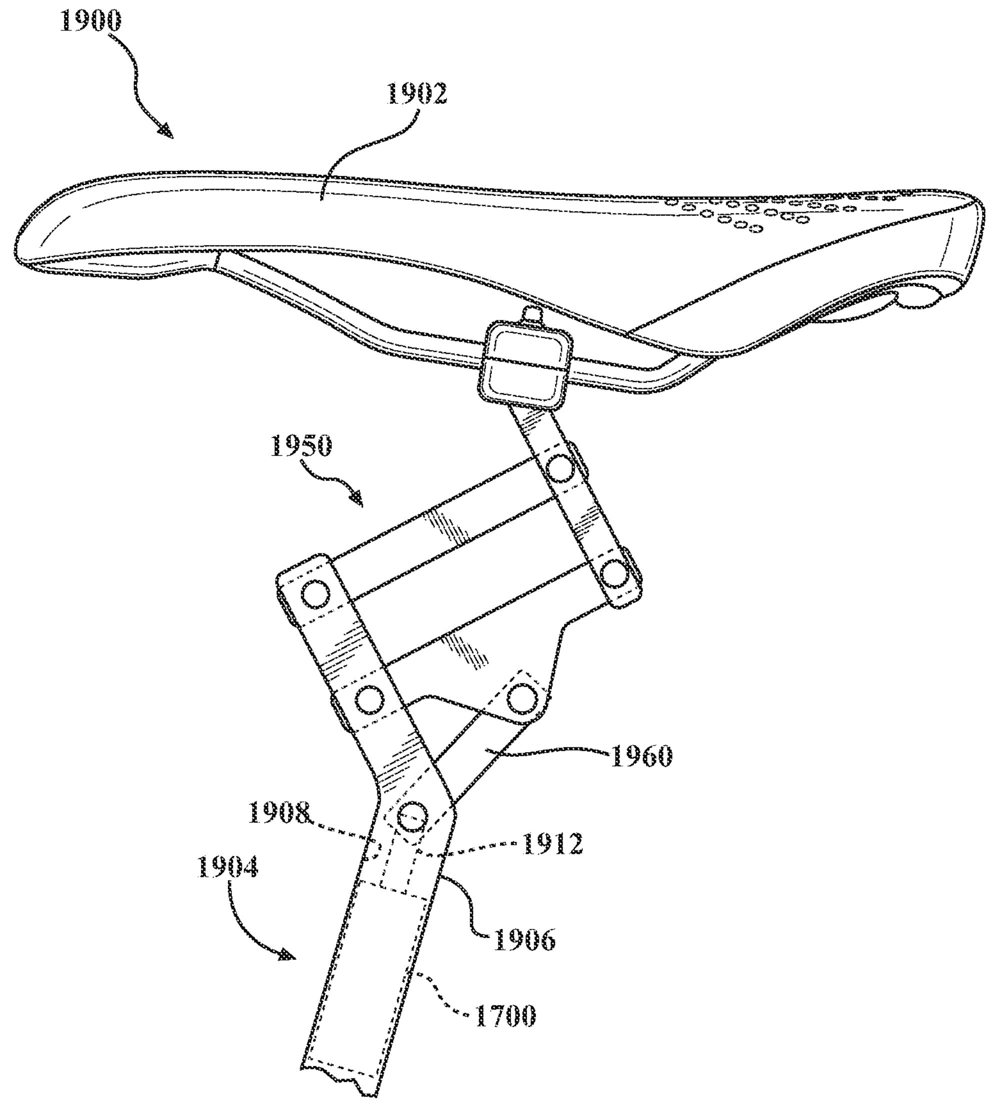
FIG. 19 is an example of a portion of a bicycle.

Referring to FIG. 19, an example of a portion of a bicycle 1900 is shown. While arrangements described herein will be made with respect to a bicycle, it will be understood that arrangements described herein can be used in connection with various devices that include a seat or saddle. For instance, arrangements described herein can be used in connection with any powered or non-powered vehicle, including, for example, a unicycle, a motorcycle, or a tricycle.

The bicycle 1900 can include a saddle 1902, which may also be referred to as a seat. The saddle 1902 can be designed to support a portion of a rider's body. The saddle 1902 can provide cushioning and/or comfort to a user. The saddle 1902 can be any type of saddle, now known or later developed.

The saddle 1902 can be operatively connected to a frame 1904 of the bicycle in any suitable manner, now known or later developed. In one or more arrangements, the saddle 1902 can be operatively connected to a seat post 1906 (which can be seat post 1800 in FIGS. 18A and 18B). The seat post 1906 can be a tubular structure. In some arrangements, at least a portion of the seat post 1906 can be hollow. In such cases, the seat post 1906 can have an inner peripheral surface 1908.

One or more vibration isolator cartridges 1700 can be operatively positioned to reduce vibrations acting upon the saddle 1902. The vibration isolator cartridge(s) 1700 can be provided in any suitable location. In one or more arrangements, the vibration isolator cartridge(s) 1700 can be located within the hollow interior of the seat post 1906. In some arrangements, the vibration isolator cartridge(s) 1700 are not connected to other structures within the seat post 1906. In some arrangements, the vibration isolator cartridge(s) 1700 can frictionally engage the inner peripheral surface 1908 of the seat post 1906. In some arrangements, the vibration isolator cartridge(s) 1700 can be operatively connected to the seat post 1906. For instance, the vibration isolator cartridge(s) 1700 can be operatively connected to the seat post 1906 by one or more fasteners, one or more welds, one or more adhesives, and/or one or more forms of mechanical engagement, or any combination thereof. The vibration isolator cartridge(s) 1700 can be operatively positioned with respect to an engaging structure, such as a pin 1912 of the saddle 1902 or other structure operatively connected to the saddle 1902. In some arrangements, the engaging structure can be moved to compress a plunger of an uppermost one of the vibration isolator cartridge(s) 1700. The engaging structure (e.g., pin 1912) can be moved by the four-bar linkage 1950 or a linkage 1960 operatively connected to the four-bar linkage 1950. The engaging structure can be an intermediate structure operatively positioned between the saddle 1902 and the vibration isolator cartridge(s) 1700. Alternatively or additionally, the four-bar linkage 1950 and/or the linkage 1960 can be an intermediate structure operatively positioned between the saddle 1902 and the vibration isolator cartridge(s) 1700.

In some arrangements, the engaging structure (e.g., the pin 1912) can directly contact the plunger 1750 of the vibration isolator cartridge 1700. In some arrangements, the engaging structure (e.g., the pin 1912) can be spaced from the vibration isolator cartridge 1700.

In use, the structure above the pin 1912 in FIG. 19 (e.g., a four-bar linkage 1950 or other structure) can push downwardly on the pin 1912. As a result, the pin 1912 can push downwardly on the vibration isolator cartridge 1700. In some arrangements, the structure and the pin 1912 can be separate structures. In other arrangements, the structure and the pin 1912 can be operatively connected to each other or can be a unitary structure.

It should be noted that, while the arrangements shown in FIG. 19 depict a single vibration isolator cartridge 1700, it will be appreciated that there can be a plurality of vibration isolator cartridges 1700. In such cases, the plurality of vibration isolator cartridges 1700 can be arranged in any suitable manner. For instance, the plurality of vibration isolator cartridges 1700 can be stacked end to end within the seat post 1906. When there is a plurality of vibration isolator cartridges 1700, the vibration isolator cartridges 1700 can be substantially identical to each other, or one or more of the vibration isolator cartridges 1700 can be different from the other vibration isolator cartridges 1700 in one or more respects.

Figure 20:
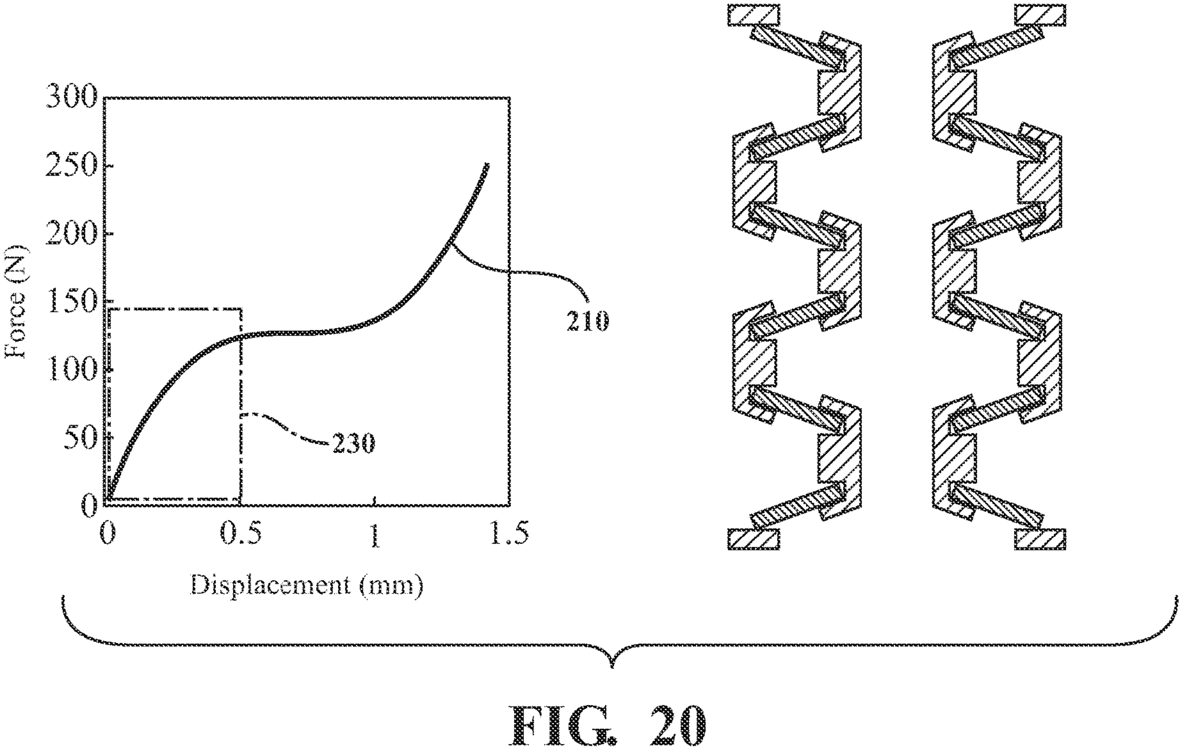
FIG. 20 shows the state of the stack of conical springs shown in FIG. 13 in an initial stiffness region of a force-displacement curve.
Figure 21:
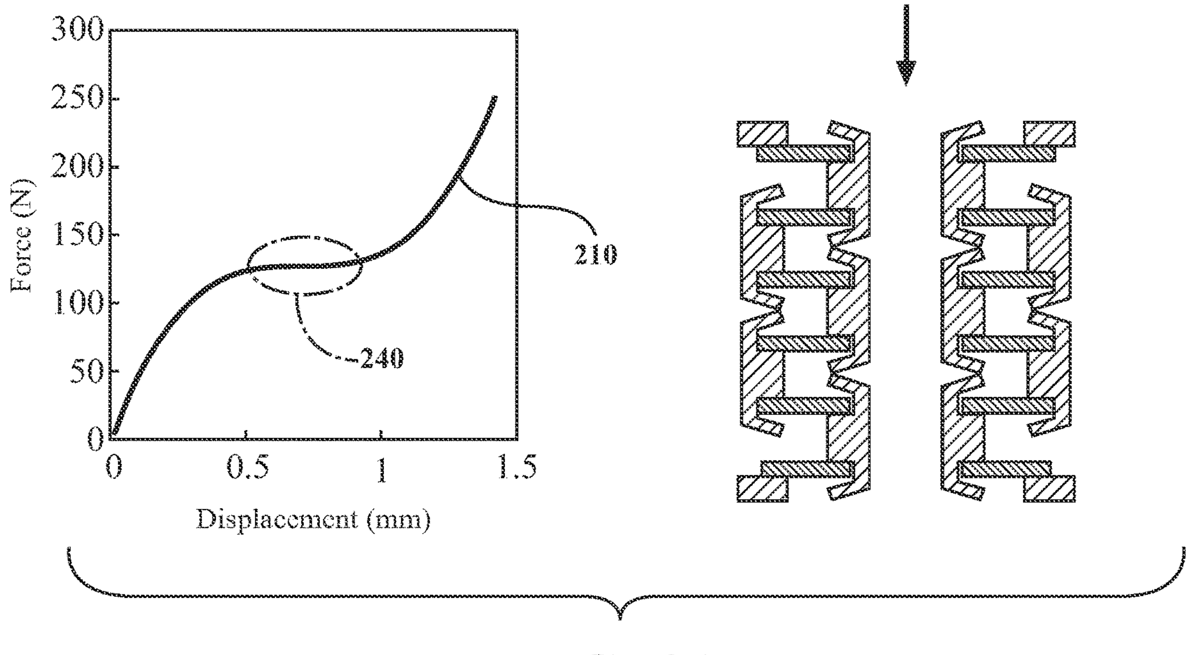
FIG. 21 shows the state of the stack of conical springs shown in FIG. 13 in a quasi-zero stiffness region of the force-displacement curve.
Figure 22:
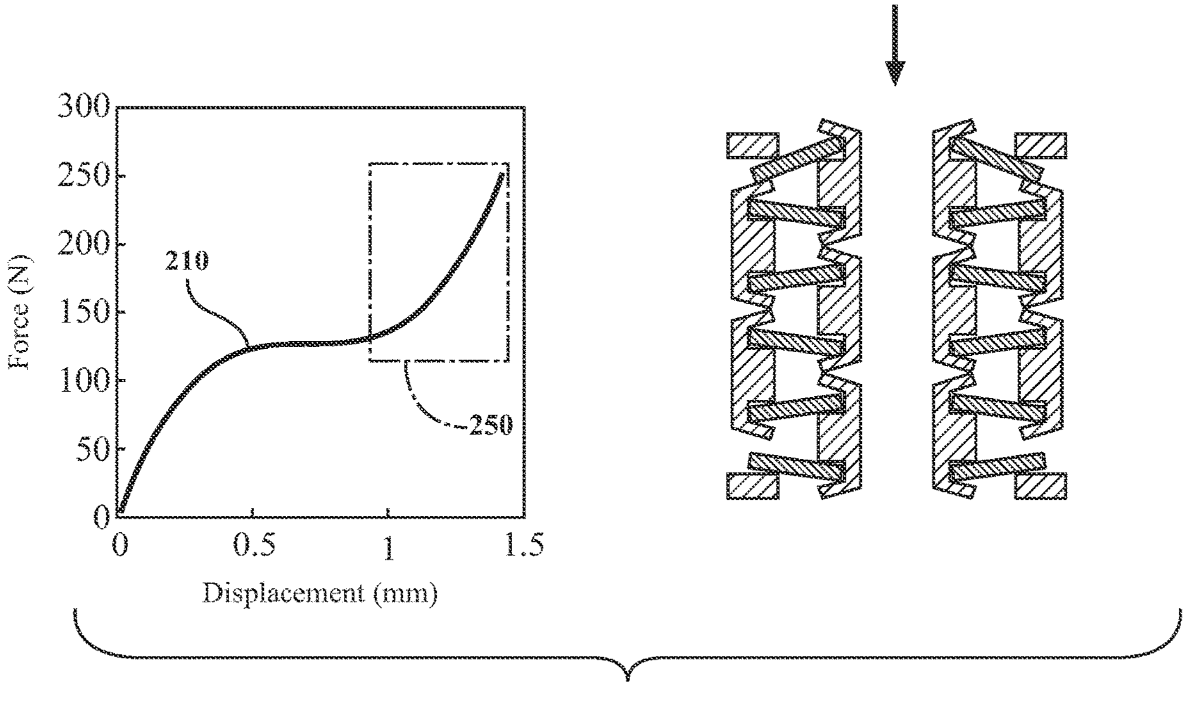
FIG. 22 shows the state of the stack of conical springs shown in FIG. 13 in a subsequent stiffness region of the force-displacement curve.

FIGS. 20-22 show the state of the stack of conical springs of FIG. 16 in various regions of the force-displacement curve. It should be noted that the above discussion of FIGS. 2A-2B and FIG. 3 applies equally to these arrangements. FIG. 20 shows a representation of the stack of conical springs in the initial stiffness region 230 of the force-deflection curve 210. While the stack of conical springs from FIG. 16 is shown, it will be appreciated that this discussion can apply to any of the stacks of conical springs described herein (including those shown in FIGS. 13-15, 17, 18A, and 18B). As can be seen, the conical springs 300 can be substantially in their neutral condition. In the initial stiffness region 230, the stiffness curve is substantially linear, increasing from the origin of the graph. The stack of conical springs can be relatively stiff in the initial stiffness region 230.

In FIG. 21, the stack of conical springs is in the quasi-zero stiffness region 240 of the force-deflection curve 210. In the quasi-zero stiffness region 240, the force-deflection curve becomes substantially flat. The stiffness becomes very low—zero or substantially zero. The quasi-zero stiffness region 240 allows for good isolation. In the quasi-zero stiffness region 240, the conical springs 300 can become substantially flat from their initial shape.

In FIG. 22, the stack of conical springs can be in the subsequent stiffness region 250. In the subsequent stiffness region 250, the stiffness curve can be substantially linear, increasing from the end of the quasi-zero stiffness region 240. The stack of conical springs can be relatively stiff in the subsequent stiffness region 250. As can be seen, the conical springs 300 can become inverted relative to their initial shape. It will be appreciated that the configuration of the stack of conical springs allows such inversion to occur.

It will be appreciated that the characteristics of the quasi-zero stiffness region can be tuned to attain the desired performance characteristics. Such tuning can be achieved by changing the characteristics of the conical springs, the quantity of the conical springs, the arrangement of the conical springs, other components of the isolators, and/or other factors, just to name a few possibilities.

Figure 23A:
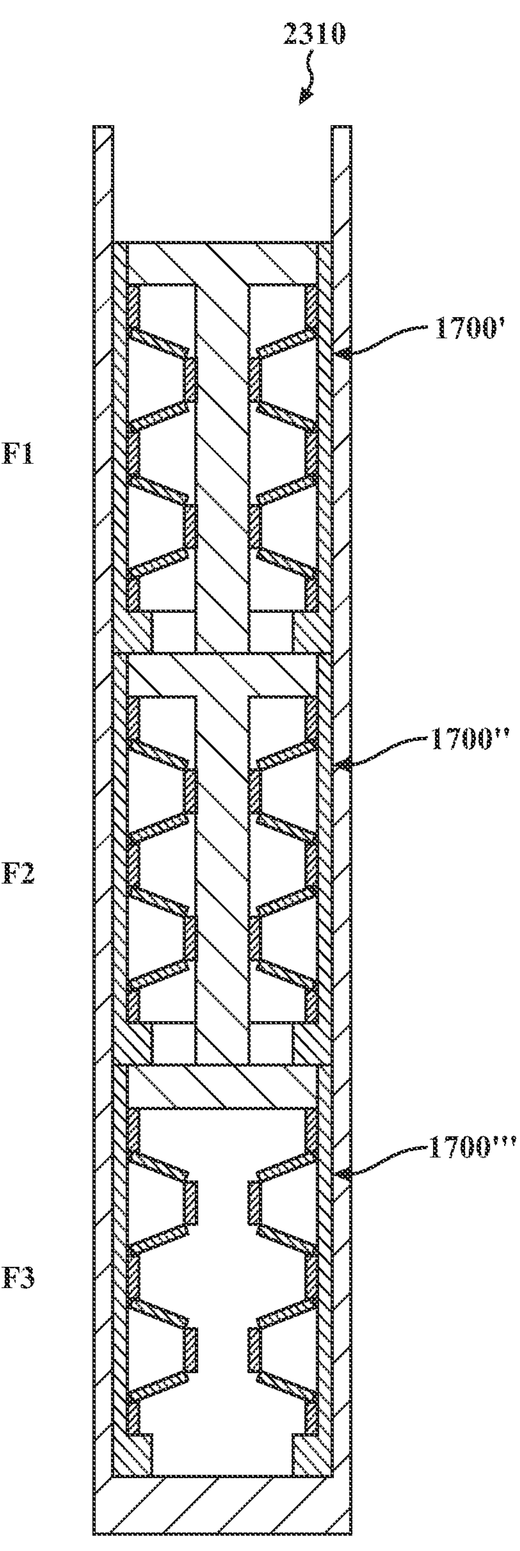
FIG. 23A shows an example of a stack of three vibration isolator cartridges.

Also, it should be noted that any quantity of vibration isolation cartridges can be used. If the structure into which they are received is longer than the vibration isolation cartridges, then spacer cartridges can be used to fill the space. Referring to FIG. 23A, an example of a 3-cartridge configuration 2310 is shown. Each of the vibration isolator cartridges 1700', 1700", 1700''' can have an associated force F1, F2, F3, respectively. Since the vibration isolator cartridges 1700', 1700", 1700''' act in parallel, the total spring force is F=F1+F2+F3.

Figure 23B:
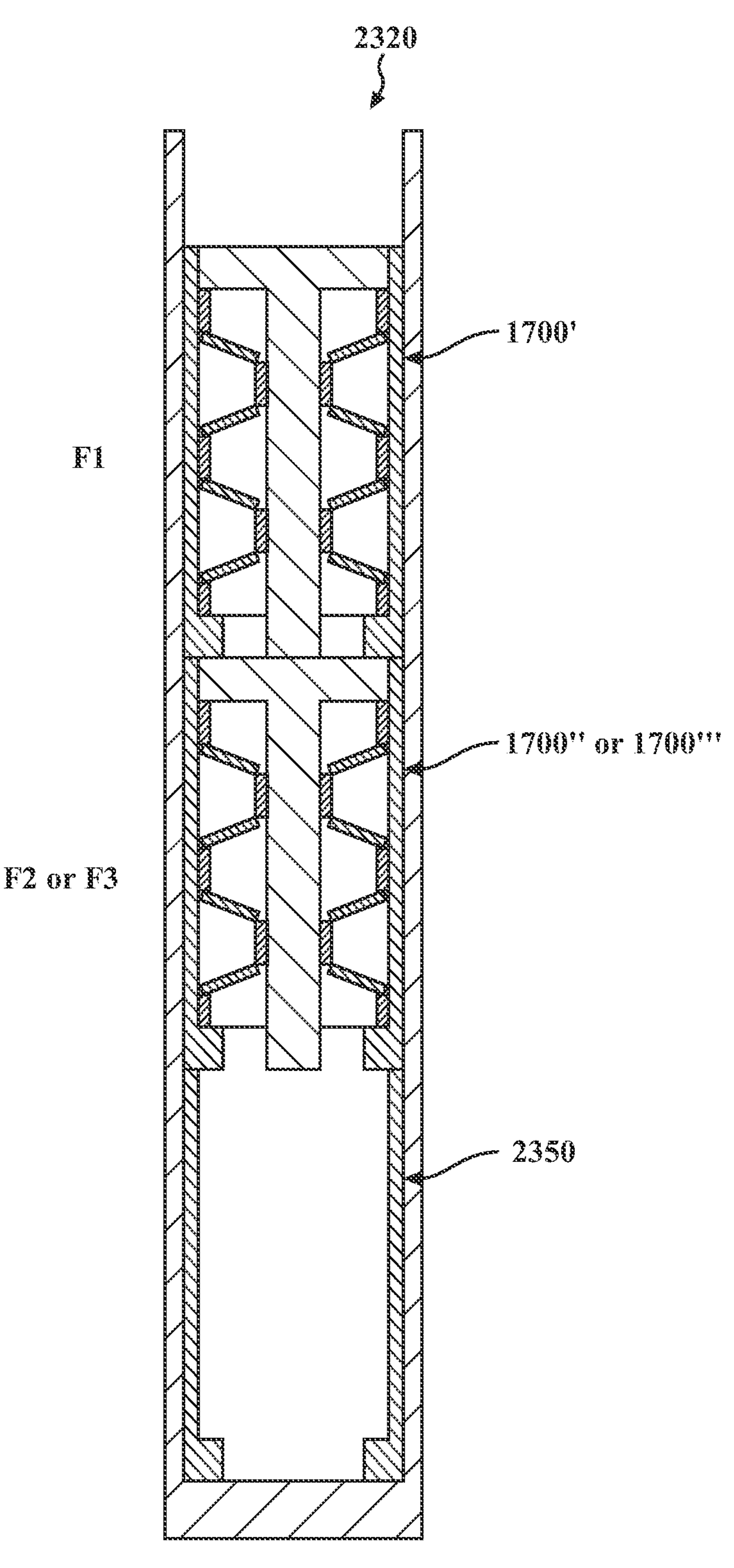
FIG. 23B shows an example of a stack of two vibration isolator cartridges and a spacer.

In FIG. 23B, an example of a 2-cartridge configuration 2320 is shown. Here there are two vibration isolator cartridges 1700' and 1700" or 1700''' with associated forces F1 and F2 or F3. In the 2-cartridge configuration 2320, there can be a spacer 2350 to fill in the space within the structure into which the vibration isolator cartridges 1700 are received. The spacer 2350 can be an empty vibration isolator cartridge, such as just the housing 1705. The spacer 2350 can have substantially the same overall dimensions as the vibration isolator cartridges. Alternatively, the dimensions of spacer 2350 can be different from the dimensions of the vibration isolator cartridges in one or more respects, such as height. Since the vibration isolator cartridges 1700' and 1700" or 1700''' act in parallel, the total spring force can be either F=F1+F2 or F=F1+F3.

Figure 24:
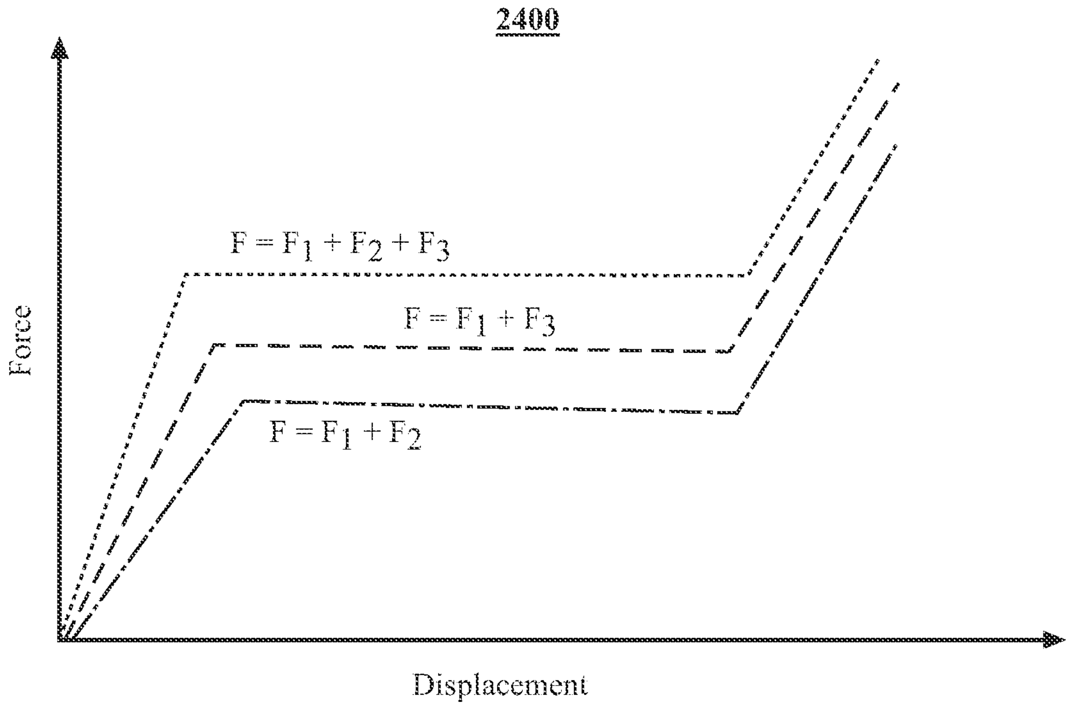
FIG. 24 shows an example of a force v. displacement graph, showing force-displacement curves for various stacks of a plurality of vibration isolator cartridges.

It will be appreciated that the modular design of the vibration isolator cartridges can enable flexibility in attaining desired vibration isolation performance characteristics. Indeed, the vibration isolator cartridges can be mixed and matched as needed to attain the desired characteristics. FIG. 24 shows an example of a force v. displacement graph 2400, showing force-displacement curves for various combinations of vibration isolator cartridges in FIGS. 23A-23B. As is evident, different combinations of vibration isolator cartridges can yield different curves on the force v. displacement graph. It will be appreciated that, though the vibration isolator cartridges are arranged in an end-to-end manner, the vibration isolator cartridges are configured to effectively act in parallel with each other to achieve the overall desired effect. Further, it will be appreciated that the compact arrangements described herein can allow a higher overall force to be achieved by the vibration isolator cartridges. It should be noted that the forces achieved by the arrangements described herein would not be attained with a single stack of conical springs. Such a stack would be limited by the diameter of the conical springs, as conical springs with sufficiently high forces do not come in small diameters. As a result, they could not be practically used in small diameter applications, such as in a bicycle seat post.

In some arrangements, a bicycle seat post can come pre-assembled with a plurality of vibration isolator cartridges inside. Thus, F1+F2+ . . . Fn can be the total isolation load or design weight. However, there may be some instances in which the circumstances may be outside of the design range. For instance, a bicycle rider may be heavier or lighter and fall outside of the design range. In such cases, additional adjustment is offered by changing the vibration isolation cartridges used in the seat post based on the rider's weight. The vibration isolation cartridges can be easily added, removed, replaced, or rearranged to get good isolation or design weight for the rider.

As noted above, there can be one or more intermediate structures operatively positioned between the saddle and the vibration isolator(s) or vibration isolator cartridge(s) located within the seat post. Alternatively or additionally, there can be one or more intermediate structures operatively positioned between the vibration isolators and the saddle. FIGS. 25A-25D and FIGS. 26A-26B show various views of an example of a bicycle saddle, showing one or more intermediate structures operatively positioned between the saddle and the vibration isolators.

Referring to FIGS. 25A-25D, a saddle 2500 can include a saddle body 2502. The saddle body 2502 can be made of any suitable material, including, for example, plastics, metal, fabric, or any combination thereof. The saddle body 2502 can include a front region 2504 and a rear region 2506. The saddle body 2502 can include an upper side 2507 and a lower side 2509. It should be noted that the positional terms, such as "front", "rear", "upper", and "lower", are used to indicate the relative position of the respective items when the saddle 2500 is used in its intended operational position. These terms are used for convenience to facilitate the discussion and are not intended to be limiting.

The saddle body 2502 can have any suitable shape. In one or more arrangements, the rear region 2506 can have a wider shape than the front region 2504. The saddle body 2502 can have an axial direction A, which can generally correspond to the forward-aft direction of the saddle body 2502. The saddle body 2502 can also include an elevational direction E. The saddle body 2502 can further include a lateral or widthwise direction W.

In some arrangements, the saddle 2500 can include padding operatively connected to the saddle body 2502. The padding can provide support, cushioning, and/or comfort to a user. However, in other arrangements, the saddle 2500 may not include padding.

The saddle 2500 can include a plurality of isolators 2520. Arrangements herein will be described in connection with a saddle 2500 that includes two isolators. However, it will be appreciated that, in some arrangements, the saddle 2500 can include a single isolator or more than two isolators. In the example shown in FIGS. 25A-25D, there can be a first isolator 2520' and a second isolator 2520". In one or more arrangements, the first isolator 2520' and the second isolator 2520" can be substantially identical to each other. In other arrangements, the first isolator 2520' and the second isolator 2520" can be different from each other in one or more respects. The first isolator 2520' and the second isolator 2520" can be spaced from each other in the widthwise direction W. The first isolator 2520' and the second isolator 2520" can be substantially aligned with each other along the axial direction A.

In some arrangements, the isolators 2520 can include a plurality of conical springs. The conical springs can be arranged in a stack. There are numerous ways in which the plurality of conical springs can be arranged in a stack. Some examples are described in connection with FIGS. 15 and 16 above. However, it will be understood that arrangements are not limited to such isolators or arrangements of conical springs.

In some arrangements, the plurality of isolators 2520 can be operatively connected to the saddle body 2502 in the rear region 2506. The plurality of isolators 2520 can be operatively connected to the saddle body 2502 in any suitable manner, now known or later developed. For instance, the plurality of isolators 2520 can be operatively connected to the saddle body 2502 by one or more fasteners, one or more forms of mechanical engagement, one or more adhesives, one or more other ways, and/or any combination thereof. In the example shown in FIG. 25B, the plurality of isolators 2520 can be operatively connected to the saddle body 2502 by one or more bolts.

There can be one or more intermediate structures 2560 operatively positioned or otherwise located between the isolators 2520 and the saddle body 2502. As a result, the isolators 2520 and the saddle body 2502 are indirectly connected to each other.

Forces and/or vibration on the saddle body 2502 can be transferred to the vibration isolators 2520 by the intermediate structure(s) 2560. In some instances, the intermediate structure(s) 2560 can be connected to the saddle body 2502 and/or to the vibration isolator(s) 2520 in any suitable manner. In some arrangements, the intermediate structure(s) 2560 may not be connected to the saddle body 2502 and/or to the isolator(s) 2520. In some arrangements, there can be an intermediate structure 2560 associated with each isolator 2520. In other arrangements, there can be an intermediate structure 2560 associated with a plurality of isolators 2520.

The intermediate structure(s) 2560 can be any structure. In some arrangements, the intermediate structure(s) 2560 can be a rigid structure, such as a metal structure. In other arrangements, the intermediate structure can be a non-rigid structure. In some arrangements, the intermediate structure(s) 2560 can be a stopper (e.g., a rubber stopper) and/or can contain a viscous fluid. In some arrangements, the intermediate structure(s) 2560 can be any type of four-bar linkage or four-bar suspension, now known or later developed. In some arrangements, such four-bar linkage or four-bar suspension can include one or more springs, one or more shape memory material members (e.g., shape memory alloy wires), one or more dampers, other similar structures, or any combination thereof.

Figure 26A:
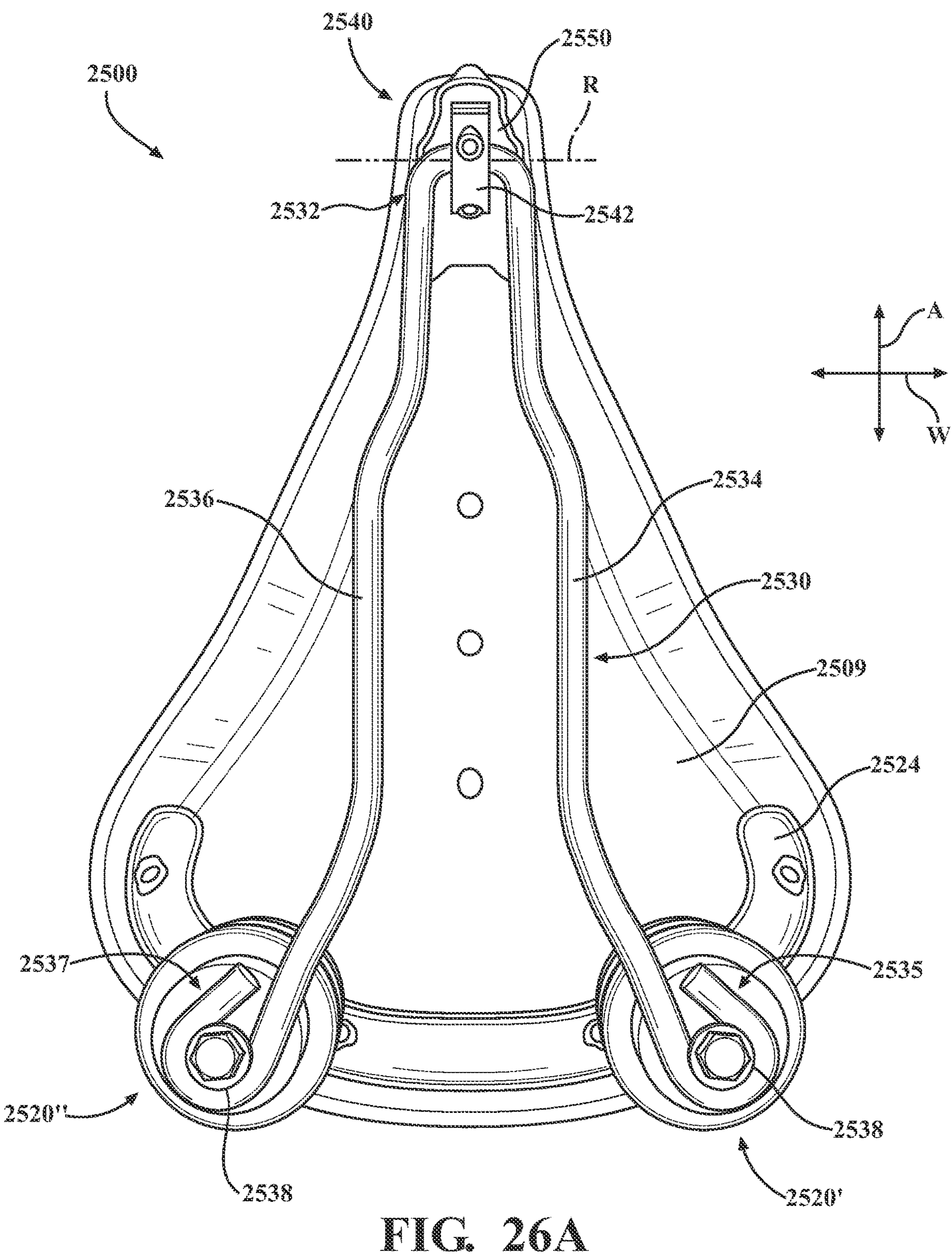
FIGS. 26A-26B show various views of an example of a bicycle saddle, showing a frame operatively positioned between the saddle body and the vibration isolators.
Figure 26B:
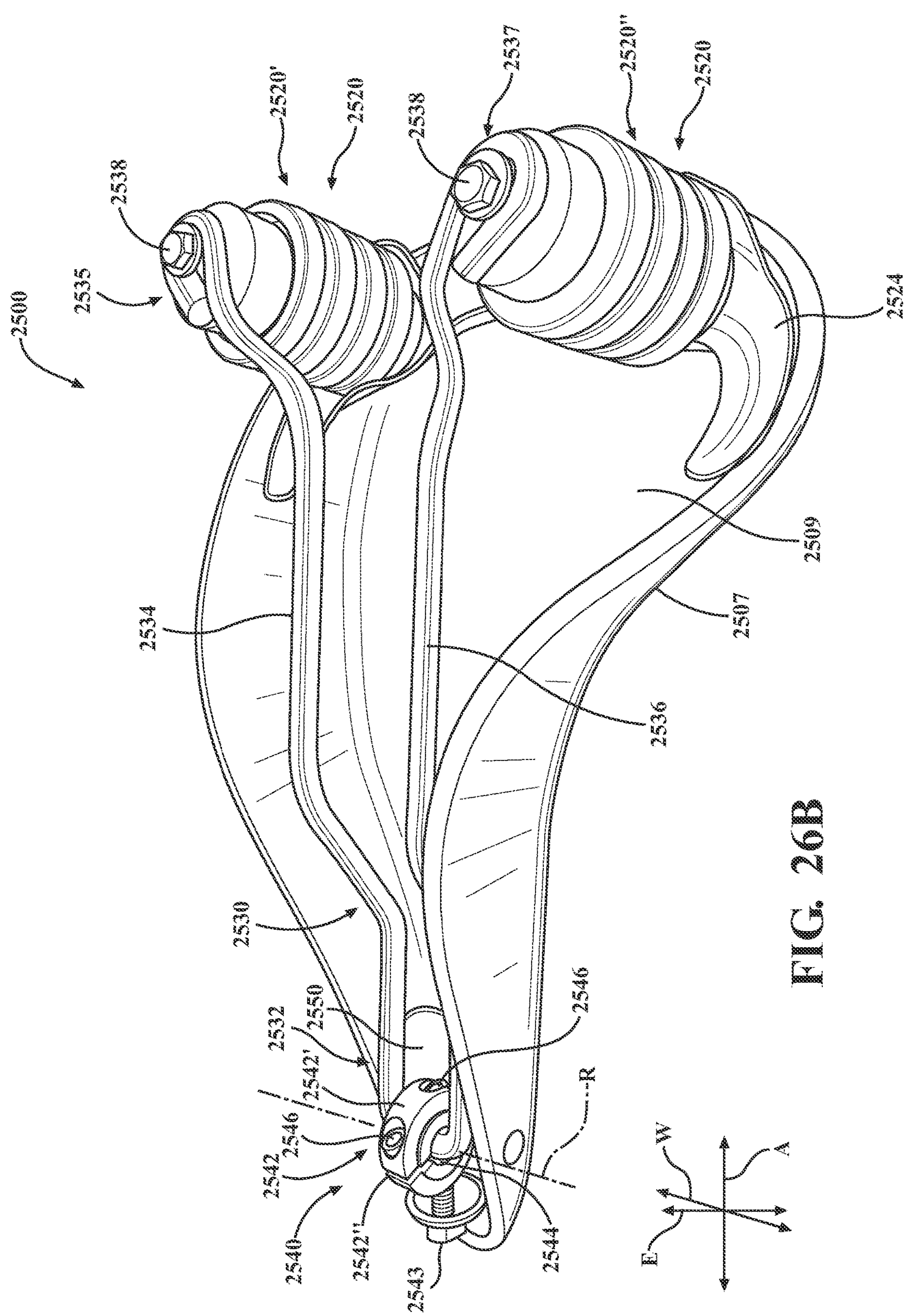

Referring to FIGS. 26A-26B, in some arrangements, the isolator(s) 2520 can be operatively connected to a saddle frame 2524, which, in turn, can be operatively connected to the saddle body 2502 in any suitable manner, including any of the ways described herein. The saddle frame 2524 can be considered to be an intermediate structure.

In some instances, the saddle 2500 can include a rail member 2530. The rail member 2530 can be a single piece, or the rail member 2530 can be made of a plurality of pieces. The rail member 2530 can be made of any suitable material, such as a metal.

The rail member 2530 can have any suitable size, shape, and/or configuration. One example configuration of the rail member 2530 is shown in FIGS. 25A-25D, but it will be understood that other arrangements are possible. In one or more arrangements, the rail member 2530 can include a substantially U-shaped region 2532. The rail member 2530 can include arms 2534, 2536 that extend away from the substantially U-shaped region 2532. The arms 2534, 2536 can include one or more bends, curves, or non-straight features. Portions of the arms 2534, 2536 can extend in a substantially straight manner. The arms 2534, 2536 can extend substantially parallel to each other, along at least a portion of their length. In some arrangements, the arms 2534, 2536 can generally diverge from each other as they extend away from the substantially U-shaped region 2532.

The arm 2534 can extend to a first end region 2535, and the arm 2536 can extend to a second end region 2537. The first end region 2535 and the second end region 2537 can have any suitable size, shape, and/or configuration. In one or more arrangements, the first end region 2535 and the second end region 2537 can be substantially identical to each other. However, in one or more arrangements, the first end region 2535 and the second end region 2537 can be different from each other in one or more respects. In the example shown in FIGS. 25A-25D, the first end region 2535 and the second end region 2537 can include the respective arms 2534, 2536 being bent back upon themselves.

The rail member 2530 can be located on the lower side 2509 of the saddle body 2502. The rail member 2530 can be operatively connected to the plurality of isolators 2520. As an example, the first end region 2535 of the rail member 2530 can be operatively connected to the first isolator 2520', and the second end region 2537 of the rail member 2530 can be operatively connected to the second isolator 2520". Any suitable form of operative connection between the rail member 2530 and the plurality of isolators 2520 can be used, such as one or more fasteners, one or more forms of mechanical engagement, one or more adhesives, one or more other ways, and/or any combination thereof. In the example shown in FIGS. 25C-25D, the rail member 2530 can be operatively connected to the isolators 2520 by one or more bolts 2538.

The rail member 2530 can be operatively connected to the saddle body 2502 in the front region 2504. More particularly, the rail member 2530 can be operatively connected to the saddle body 2502 in the front region 2504 by a revolute connection 2540. The revolute connection 2540 can allow the saddle body 2502 to pivot about an axis R defined by the revolute connection 2540. The axis R can be substantially parallel to the widthwise axis W. The revolute connection 2540 can accommodate rolling forces in the axial direction A.

Figure 25A:
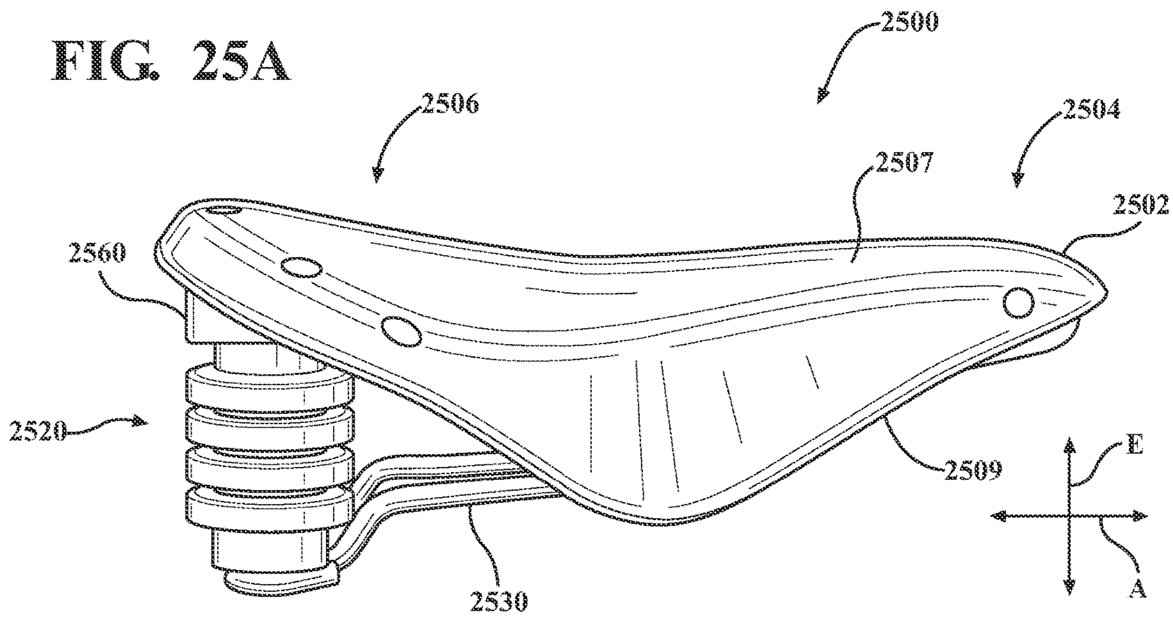
FIGS. 25A-25D show various views of an example of a bicycle saddle, showing intermediate structures operatively positioned between the saddle body and the vibration isolators.
Figure 25B:
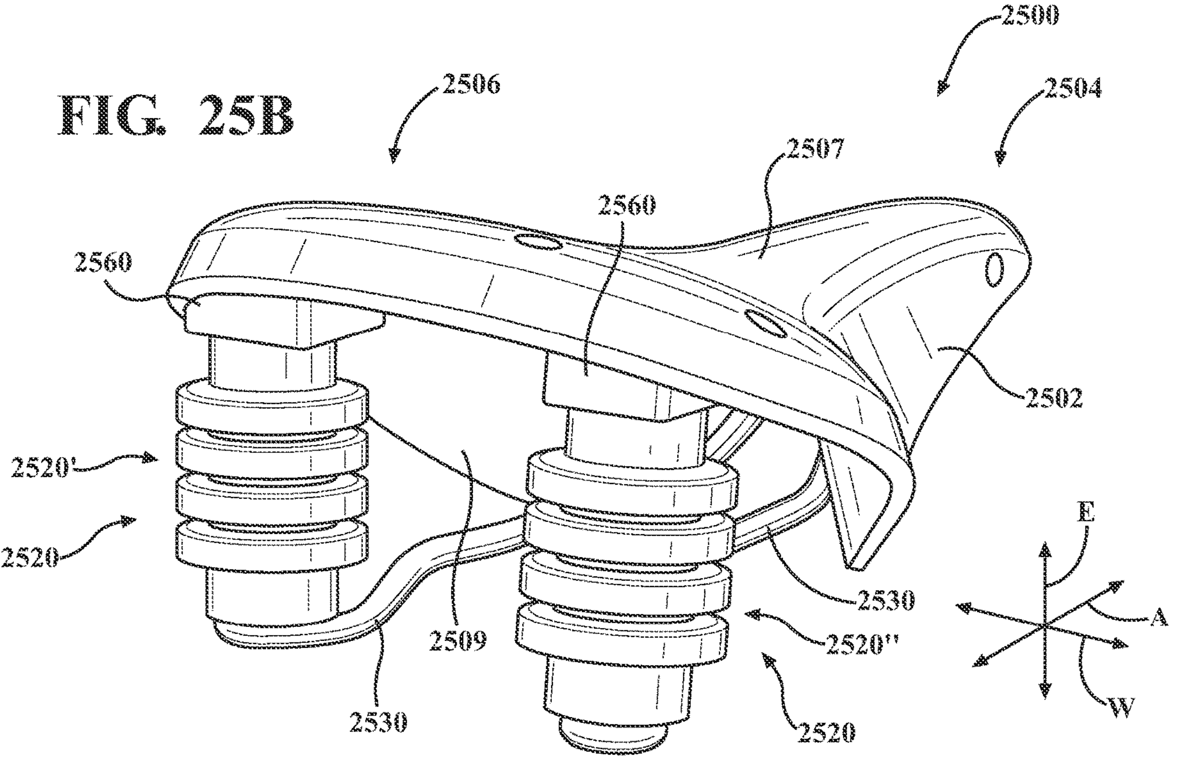
Figure 25C:
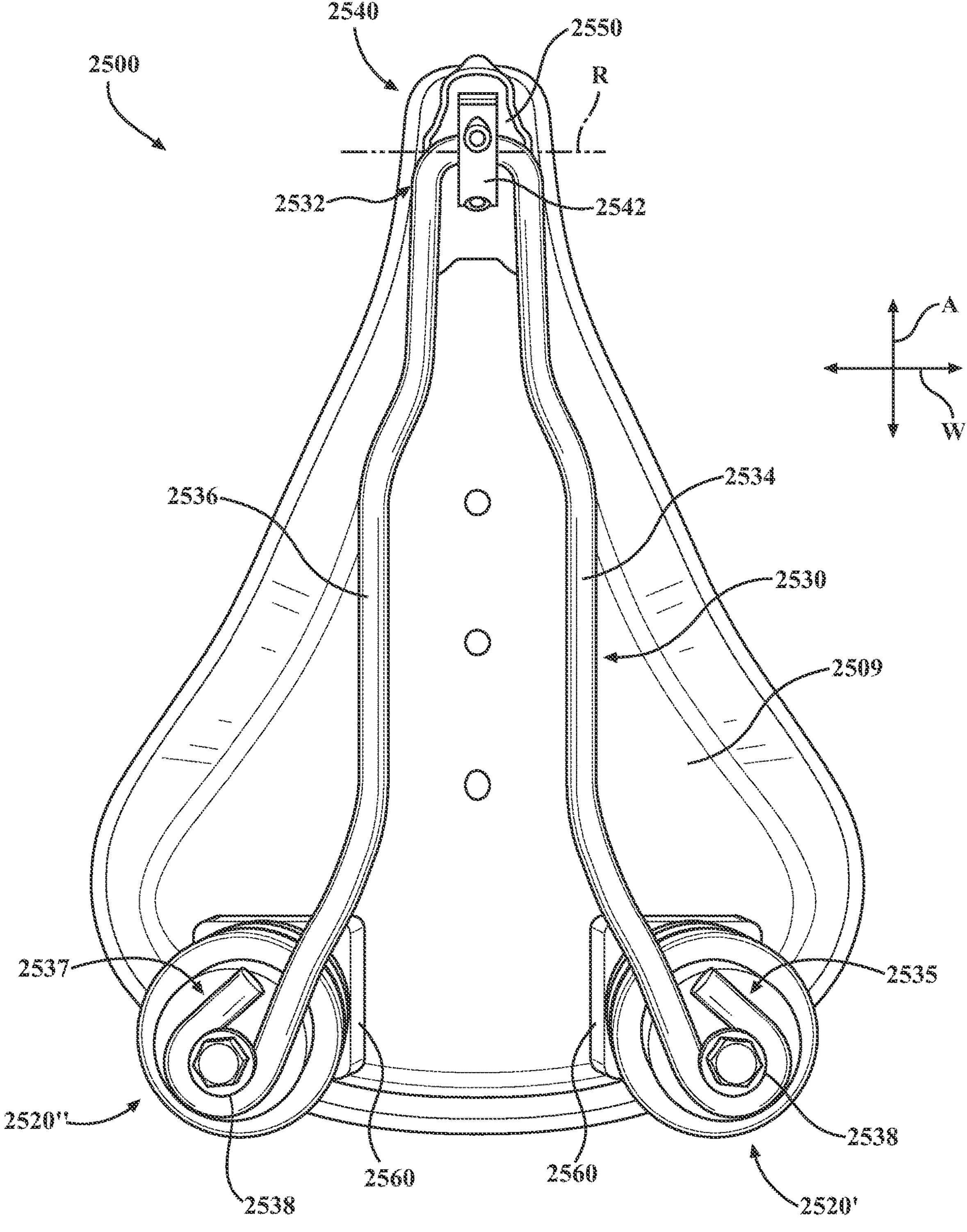
Figure 25D:
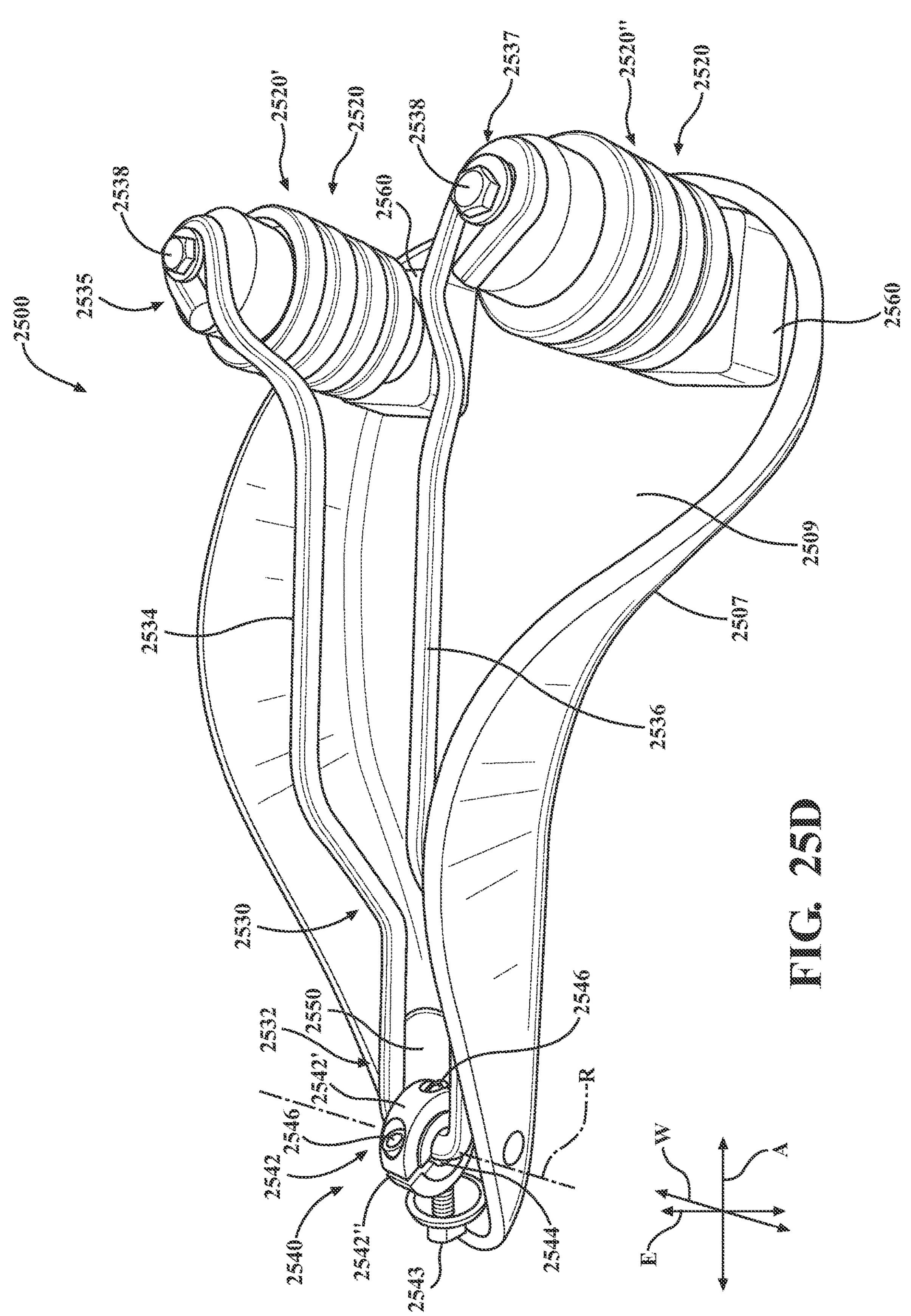

The revolute connection 2540 can be achieved in any suitable manner. One example is shown in FIGS. 25C-25D. In this example, the rail member 2530 can be operatively connected to the saddle body 2502 by a collar 2542. In some arrangements, the collar 2542 can be made of two collar portions 2542', 2542". The two collar portions 2542', 2542" can collectively define a central aperture 2544. A portion of the rail member 2530 can be received in the central aperture 2544. The two collar portions 2542', 2542" can be operatively connected to each other in any suitable manner. For example, one or more fasteners 2546 can be used to operatively connect the two collar portions 2542', 2542" together. The collar 2542 can be made of any suitable material, such as plastic, rubber, or metal, just to name a few possibilities.

The collar 2542 can be operatively connected to the saddle body 2502. For instance, the collar 2542 can be operatively connected to the lower side 2509 of the saddle body 2502. In one or more arrangements, a bracket 2550 can be operatively connected to the saddle body 2502, such as by one or more fasteners, one or more forms of mechanical engagement, one or more adhesives, one or more other ways, and/or any combination thereof. Similarly, the collar 2542 can be operatively connected to the bracket 2550 in any suitable manner, such as by one or more fasteners, one or more forms of mechanical engagement, one or more adhesives, one or more other ways, and/or any combination thereof. In one or more arrangements, a fastener 2543 can be used to operatively connect the collar 2542 and the bracket 2550. The fastener 2543 can be received in and/or engage an aperture in the collar 2542.

The position of the collar 2542 can be substantially fixed relative to the saddle body 2502. However, the rail member 2530 can rotate within the collar 2542, thereby providing the revolute connection 2540. In some arrangements, one or more bearings can be operatively positioned between the collar 2542 and the rail member 2530 to facilitate the rotation of the rail member 2530. As an example, the bearings can be located at least partially within or at least partially on the collar 2542. The bearings can be any suitable type of bearing, now known or later developed.

The vibration isolators 2520 can be configured to exhibit a non-linear stiffness profile. The non-linear stiffness profile can include a region of quasi-zero stiffness. An example of a force-deflection graph 200 for this type of actuator is shown in FIG. 2A. The discussion of FIGS. 2A and 2B above applies equally here.

Various arrangements have been described herein. It will be understood that any combination of these arrangements can be implemented. Alternatively or additionally, any combination or subset of the arrangements in U.S. Patent Publication No. 2023/0020004, U.S. Pat. No. 11,485,437, U.S. Patent Publication No. 2023/0219646, and U.S. Pat. No. 11,565,763, which are incorporated herein by reference, can be made.

It will be appreciated that arrangements described herein can provide numerous benefits, including one or more of the benefits mentioned herein. For example, arrangements described herein can isolate the vibrations of a bicycle saddle. Arrangements described herein can improve rider comfort and/or ride quality. Arrangements described herein can use isolators with low cost components (e.g., conical springs). Some arrangements described herein can use at least three connection points of the saddle (e.g., at least two isolators in the rear region of the saddle and a revolute connection in the front region of the saddle). As a result, the isolators can avoid the use of a central shaft and/or an outer sleeve. Arrangements described herein provide a bicycle seat that is configured to address roll and pitch motions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A bicycle saddle system comprising:
a saddle body;
a vibration isolator configured as a cartridge and including:
a housing;
a plunger configured to be depressed toward a distal end portion of the housing, the plunger including a head and a shaft; and
a stack of a plurality of conical springs operatively positioned within the housing between the plunger and the distal end portion of the housing, the shaft extending through central apertures of the conical springs; and
an intermediate structure operatively positioned between the saddle body and the vibration isolator.

2. The bicycle saddle system of claim 1, wherein the intermediate structure is a four-bar linkage.

3. The bicycle saddle system of claim 1, wherein the intermediate structure is a frame.

4. The bicycle saddle system of claim 1, wherein the stack of the plurality of conical springs does not include a central shaft.

5. The bicycle saddle system of claim 1, wherein the stack of the plurality of conical springs does not include an outer sleeve.

6. The bicycle saddle system of claim 1, wherein the vibration isolator is configured to exhibit a non-linear stiffness profile including a region of quasi-zero stiffness.

7. The bicycle saddle system of claim 1, wherein the stack of the plurality of conical springs is arranged in an alternating pattern, wherein each of the plurality of conical springs includes an outer diameter body portion and an inner diameter body portion, and wherein, for each of the plurality of conical springs, at least one of:

the outer diameter body portion faces the outer diameter body portion of a neighboring one of the plurality of conical springs; and the inner diameter body portion faces the inner diameter body portion of a neighboring one of the plurality of conical springs.

8. The bicycle saddle system of claim 7, wherein the vibration isolator includes a plurality of inner spacers, and wherein the inner spacers separate the inner diameter body portion of a neighboring pair of the conical springs.

9. The bicycle saddle system of claim 7, wherein the vibration isolator includes a plurality of outer spacers, and wherein the outer spacers separate the outer diameter body portion of a neighboring pair of the conical springs.

10. The bicycle saddle system of claim 1, wherein the conical springs are arranged in an alternating pattern, wherein each conical spring includes an outer diameter body portion and an inner diameter body portion, and wherein, for at least some of the conical springs, at least one of:

the outer diameter body portion faces the outer diameter body portion of a neighboring one of the conical springs; and the inner diameter body portion faces the inner diameter body portion of a neighboring one of the conical springs.

11. The bicycle saddle system of claim 10, wherein the outer diameter body portion of one of the conical springs and the outer diameter body portion of a neighboring one of the conical springs are separated by an outer spacer, wherein the outer spacer does not increase an overall envelope of the plurality of conical springs in a lateral direction.

12. The bicycle saddle system of claim 10, wherein the inner diameter body portion of one of the conical springs and the inner diameter body portion of a neighboring one of the conical springs are separated by an inner spacer, and wherein the inner spacer does not increase an overall envelope of the plurality of conical springs in a lateral direction.

13. The bicycle saddle system of claim 10, wherein the conical springs are double stacked in an alternating pattern.

14. A system for vibration isolation of a bicycle saddle, the system comprising:

a bicycle saddle;

a bicycle frame;

an intermediate structure operatively positioned between the bicycle saddle and the bicycle frame; and a vibration isolator located within a portion of the bicycle frame, the vibration isolator being operatively positioned with respect to the intermediate structure, the vibration isolator being configured to exhibit a non-linear stiffness profile including a region of quasi-zero stiffness, the vibration isolator configured as a cartridge and including:

a housing;

a plunger configured to be depressed toward a distal end portion of the housing, the plunger including a head and a shaft; and a stack of a plurality of conical springs operatively positioned within the housing between the plunger and the distal end portion of the housing, the shaft extending through central apertures of the conical springs.

15. The system of claim 14, wherein the bicycle frame includes a seat post, wherein the vibration isolator is received in the seat post.

16. The system of claim 14, wherein the intermediate structure is a four-bar linkage.

17. The system of claim 14, wherein the intermediate structure is a pin.

18. The system of claim 14, wherein each vibration isolator further includes a plunger, and wherein the plunger is configured to be depressed toward a distal end portion of the vibration isolator, whereby the plurality of conical springs is compressed when the plunger is depressed.

19. The system of claim 14, wherein the stack of the plurality of conical springs is configured to be in the region of quasi-zero stiffness of the non-linear stiffness profile when compressed.

20. The system of claim 14, wherein the vibration isolator includes a plurality of vibration isolators stacked in an end-to-end manner.

* * * * *